US011461446B2

(12) United States Patent
Hirabayashi et al.

(10) Patent No.: US 11,461,446 B2
(45) Date of Patent: *Oct. 4, 2022

(54) INFORMATION PROCESSING DEVICE, APPLICATION SOFTWARE START-UP SYSTEM, AND APPLICATION SOFTWARE START-UP METHOD

(71) Applicant: Maxell, Ltd., Kyoto (JP)

(72) Inventors: Masayuki Hirabayashi, Ibaraki (JP);
Yasunobu Hashimoto, Ibaraki (JP);
Kazuhiko Yoshizawa, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,042

(22) Filed: Sep. 1, 2020

(65) Prior Publication Data
US 2020/0394293 A1 Dec. 17, 2020

Related U.S. Application Data

(60) Division of application No. 16/535,574, filed on Aug. 8, 2019, now Pat. No. 10,783,228, which is a
(Continued)

(51) Int. Cl.
*G06F 21/32* (2013.01)
*G06F 21/12* (2013.01)
(Continued)

(52) U.S. Cl.
CPC .............. *G06F 21/32* (2013.01); *G06F 21/12* (2013.01); *G06F 21/31* (2013.01); *G06F 21/35* (2013.01);
(Continued)

(58) Field of Classification Search
CPC ........... G06K 9/00; G06F 3/041; G06F 21/32; G06F 21/00; G06F 21/12; G06F 21/31;
(Continued)

(56) References Cited

U.S. PATENT DOCUMENTS 8,042,061 B1 10/2011 Stotts
8,218,459 B1 7/2012 Stucker
(Continued)

FOREIGN PATENT DOCUMENTS

CN 1613425 A 5/2005
CN 102655555 A 9/2012
(Continued)

OTHER PUBLICATIONS

International Search Report of PCT/JP2014/065644 dated Jan. 13, 2015.
(Continued)

*Primary Examiner* — Samson B Lemma
(74) *Attorney, Agent, or Firm* — Mattingly & Malur, PC

(57) ABSTRACT

The purpose of the present invention is to provide a portable terminal and an application software start-up system whereby the application software that is started up is limited depending on the state of a user, thereby providing an improved ease of use. For this purpose, an application software start-up method for an information processing device comprises: performing identity authentication based on static biological information; determining the state of the user by comparing dynamic biological information acquired from the body of the user with previously measured dynamic biological information; and limiting the application software that is started up in accordance with the determined state of the user and on the basis of a permission level that is set in advance for each application software item.

7 Claims, 19 Drawing Sheets

Related U.S. Application Data continuation of application No. 15/315,735, filed as application No. PCT/JP2014/065644 on Jun. 12, 2014, now Pat. No. 10,423,769.

(51) Int. Cl.

| | | |
|---|---|---|
| *G06F 21/35* | (2013.01) | |
| *G06F 21/62* | (2013.01) | |
| *H04W 12/06* | (2021.01) | |
| *G06F 21/31* | (2013.01) | |
| *G06F 21/60* | (2013.01) | |

(52) U.S. Cl.
CPC ........ *G06F 21/604* (2013.01); *G06F 21/6218* (2013.01); *H04W 12/06* (2013.01); *G06F 2221/2105* (2013.01)

(58) Field of Classification Search
CPC .......... G06F 21/35; G06F 21/60; G06F 21/62; G06F 21/6218; G06F 21/604; H04L 9/32; H04W 12/06
See application file for complete search history.

(56) References Cited

U.S. PATENT DOCUMENTS

| | | | |
|---|---|---|---|
| 8,543,834 B1* | 9/2013 | Barra ...................... | G06F 21/32 726/16 |
| 8,646,060 B1 | 2/2014 | Ben Ayed | |
| 8,667,562 B2* | 3/2014 | LeBeau ................... | G06F 21/62 726/2 |
| 9,111,085 B1* | 8/2015 | Darmour ................. | G06F 21/32 |
| 9,112,709 B1 | 8/2015 | Tofigh | |
| 9,314,193 B2 | 4/2016 | Haddad | |
| 9,373,047 B2 | 6/2016 | Aoki | |
| 9,792,460 B2* | 10/2017 | An .......................... | G06F 21/32 |
| 11,151,288 B2* | 10/2021 | An .......................... | G06F 21/32 |
| 2005/0223234 A1 | 10/2005 | McOwan | |
| 2008/0045806 A1 | 2/2008 | Keppler | |
| 2008/0229408 A1 | 9/2008 | Dinges | |
| 2008/0288291 A1 | 11/2008 | Bartelt | |
| 2009/0039241 A1 | 2/2009 | Ueki | |
| 2009/0083847 A1 | 3/2009 | Fadell et al. | |
| 2009/0232362 A1* | 9/2009 | Otsubo ................ | G06K 9/0004 382/115 |
| 2010/0131414 A1 | 5/2010 | Tame | |
| 2010/0318636 A1 | 12/2010 | Matsumura et al. | |
| 2011/0072502 A1 | 3/2011 | Song | |
| 2011/0083018 A1* | 4/2011 | Kesanupalli ........... | G06Q 20/40 713/186 |
| 2011/0175822 A1* | 7/2011 | Poon .................... | G06F 3/04842 345/173 |
| 2012/0324235 A1* | 12/2012 | Bolle ...................... | G06F 21/32 713/186 |
| 2013/0322705 A1 | 12/2013 | Wong | |
| 2014/0347479 A1 | 11/2014 | Givon | |
| 2015/0035643 A1 | 2/2015 | Kursun | |
| 2015/0074418 A1* | 3/2015 | Lee ......................... | G06F 21/32 713/186 |
| 2015/0208244 A1 | 7/2015 | Nakao | |
| 2015/0235055 A1* | 8/2015 | An .......................... | G06F 21/74 713/186 |
| 2015/0257004 A1* | 9/2015 | Shanmugam ....... | H04W 12/065 455/411 |
| 2016/0142407 A1* | 5/2016 | Chun .................. | H04L 63/0861 726/5 |
| 2016/0267732 A1* | 9/2016 | Agrafioti ................ | A61B 5/318 |

FOREIGN PATENT DOCUMENTS

| | | |
|---|---|---|
| CN | 103605459 A | 2/2014 |
| CN | 103634453 A | 3/2014 |
| CN | 103716456 A | 4/2014 |
| CN | 103744506 A | 4/2014 |
| JP | 2003-58269 A | 2/2003 |
| JP | 2005-293209 A | 10/2005 |
| JP | 2007-257666 A | 10/2007 |
| JP | 2010-170314 A | 8/2010 |
| JP | 2010-541046 A | 12/2010 |
| JP | 2013-140440 A | 7/2013 |
| JP | 2014-71476 A | 4/2014 |
| WO | 2009/096561 A1 | 8/2009 |

OTHER PUBLICATIONS

Chinese Office Action received in corresponding Chinese Application No. 201480079782.0 dated Sep. 11, 2018.

Clarke, N.L, and S.M. Furnell. "A Composite User Authentication Architecture for Mobile Devices." Journal of Information Warfare, vol. 5, No. 2, 2006, pp. 11-29. JSTOR, www.jstor.org/stable/26504070. (Year: 2006).

Japanese Office Action received in corresponding Japanese Application No. 2017-103459 dated Feb. 27, 2018.

* cited by examiner

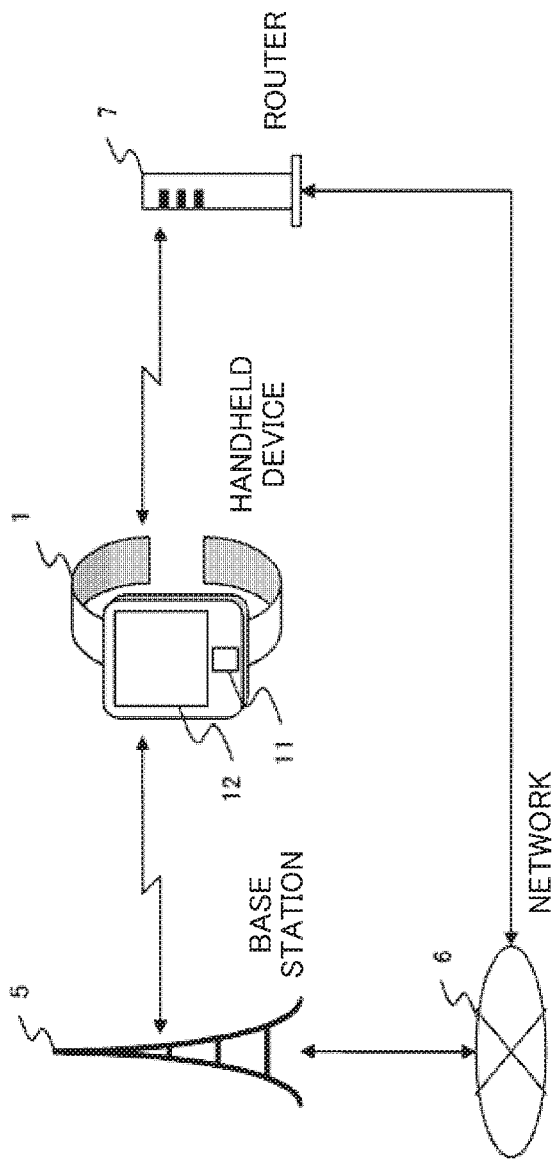

F I G. 5 A
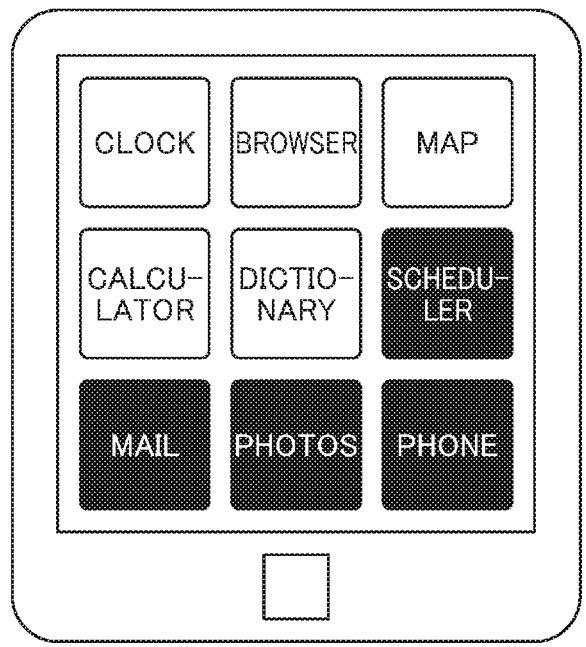
F I G. 5 B
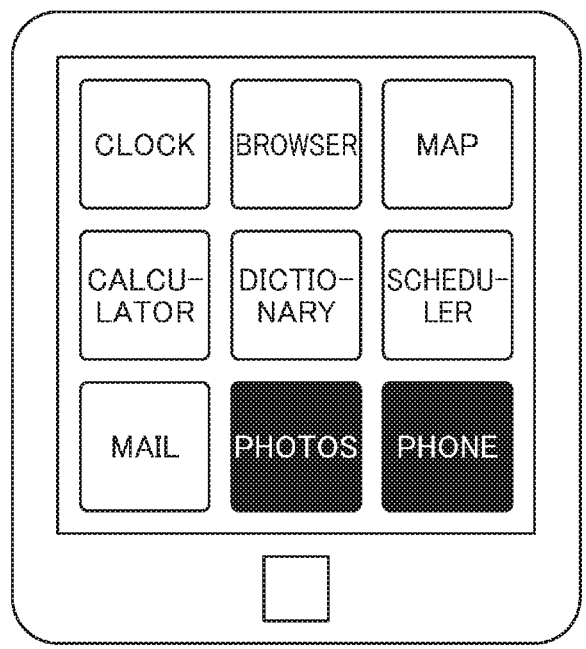

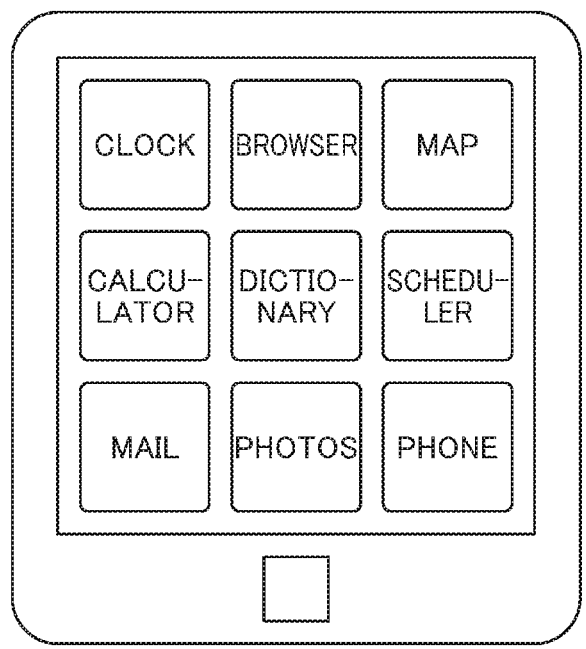
F I G. 5 C

F I G. 1 1 A
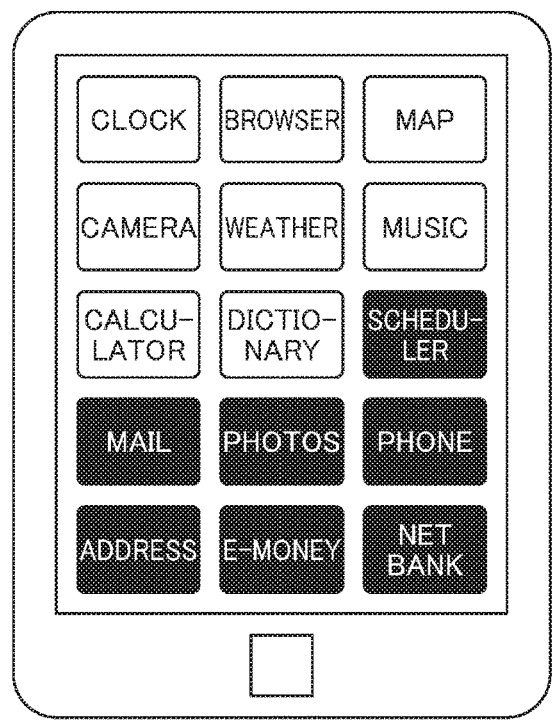
F I G. 1 1 B
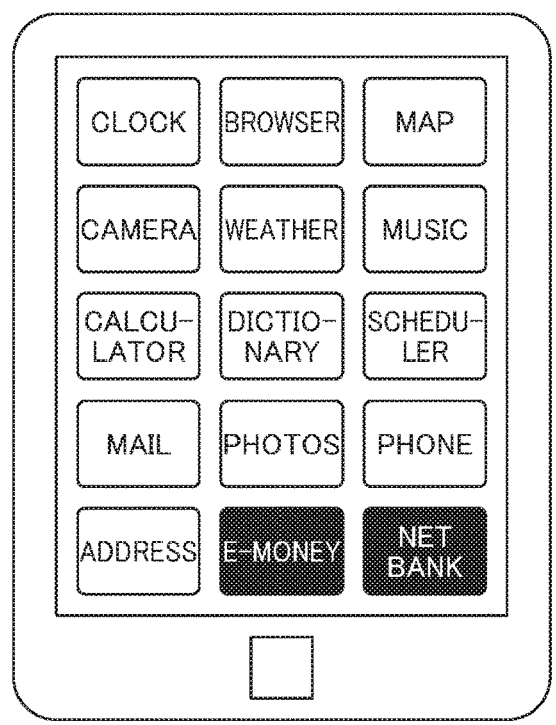

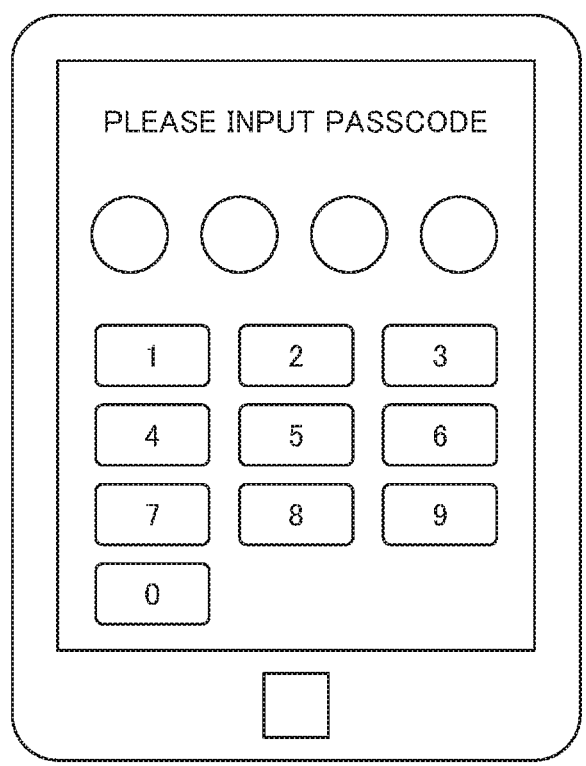
F I G. 1 5

INFORMATION PROCESSING DEVICE, APPLICATION SOFTWARE START-UP SYSTEM, AND APPLICATION SOFTWARE START-UP METHOD

TECHNICAL FIELD

The present invention relates to a start-up method of application software used in an information processing device.

BACKGROUND ART

A background art of the present technical field, there is JP 2005-293209 A (Patent Document 1). A problem is described in Patent Document 1 as follows. "In an existing biometrics authentication, static biometric information is simply used, and it is possible to verify an authorized user, but reading the user's intension is not performed. For this reason, when the user is involved in a certain crime and threatened and forced to perform an illegal operation by a criminal, although a system is equipped with a biometrics authentication, it is likely that the system is illegally operated, leading to heavy damage."

A solution to this problem is described as follows. "A physical feature information measuring unit that measures biometric information indicating a physical feature, a biometrics authentication unit that performs user identification based on information of the physical feature measured by the physical feature information measuring unit, an emotional feature information measuring unit that measures biometric information indicating an emotional feature, an emotional biometrics determination unit that determines a user mental state based on information of the emotional feature measured by the emotional feature information measuring unit, and an integrated authentication unit that determines that it is an authorized user and it is an authentication operation according to the user's intension based on information of a user identification result by the biometrics authentication unit and a mental state determination result by the emotional biometrics determination unit are provided."

CITATION LIST

Patent Document

Patent Document 1: JP 2005-293209 A

SUMMARY OF THE INVENTION

Problems to be Solved by the Invention

In the technique disclosed in Patent Document 1, by using the emotional biometrics, it is possible to detect a situation in which the user is threatened and forced to perform an illegal operation by a criminal, in addition to an examination of the user authentication performed by the existing biometrics authentication. Further, it is possible to check the "user's will" and the "user's intension" for the operation of the user. However, in an information processing device using a plurality of pieces of application software, checking of the "user's will" and the "user's intension" is not necessarily necessary for all pieces of application software, and there are application software in which no checking is necessary and application software in which additional checking of the "state of the user" is desirable.

In this regard, it is an object of the present invention to provide an information processing device and an application software start-up system which are convenient and capable of limiting application software according to the state of the user.

Solutions to Problems

In order to solve the above problem, for example, a configuration set forth in a claim is employed. The present invention includes a plurality of mechanisms capable of solving the above problem, and as an example, provided is an application software start-up method of an information processing device which includes performing user authentication based on static biometric information, determining a state of a user by comparing dynamic biometric information acquired from a body of the user with dynamic biometric information which is measured in advance, and limiting application software to be started according to the determined state of the user based on a permission level which is set to each application software in advance.

Effects of the Invention

According to the present invention, it is possible to provide an information processing device, an application software start-up system, and an application software start-up method which are convenient.

BRIEF DESCRIPTION OF THE DRAWINGS

FIG. 1 is a configuration diagram illustrating a communication system including a handheld device according to a first embodiment.

FIG. 5A, 5B, 5C illustrate a display screen of the handheld device according to the first embodiment.

FIG. 11A, 11B, 11C illustrate a display screen of the handheld device according to the second embodiment.

FIG. 15 illustrates a display screen of the handheld device according to the fourth embodiment.

MODE FOR CARRYING OUT THE INVENTION

Figure 2:
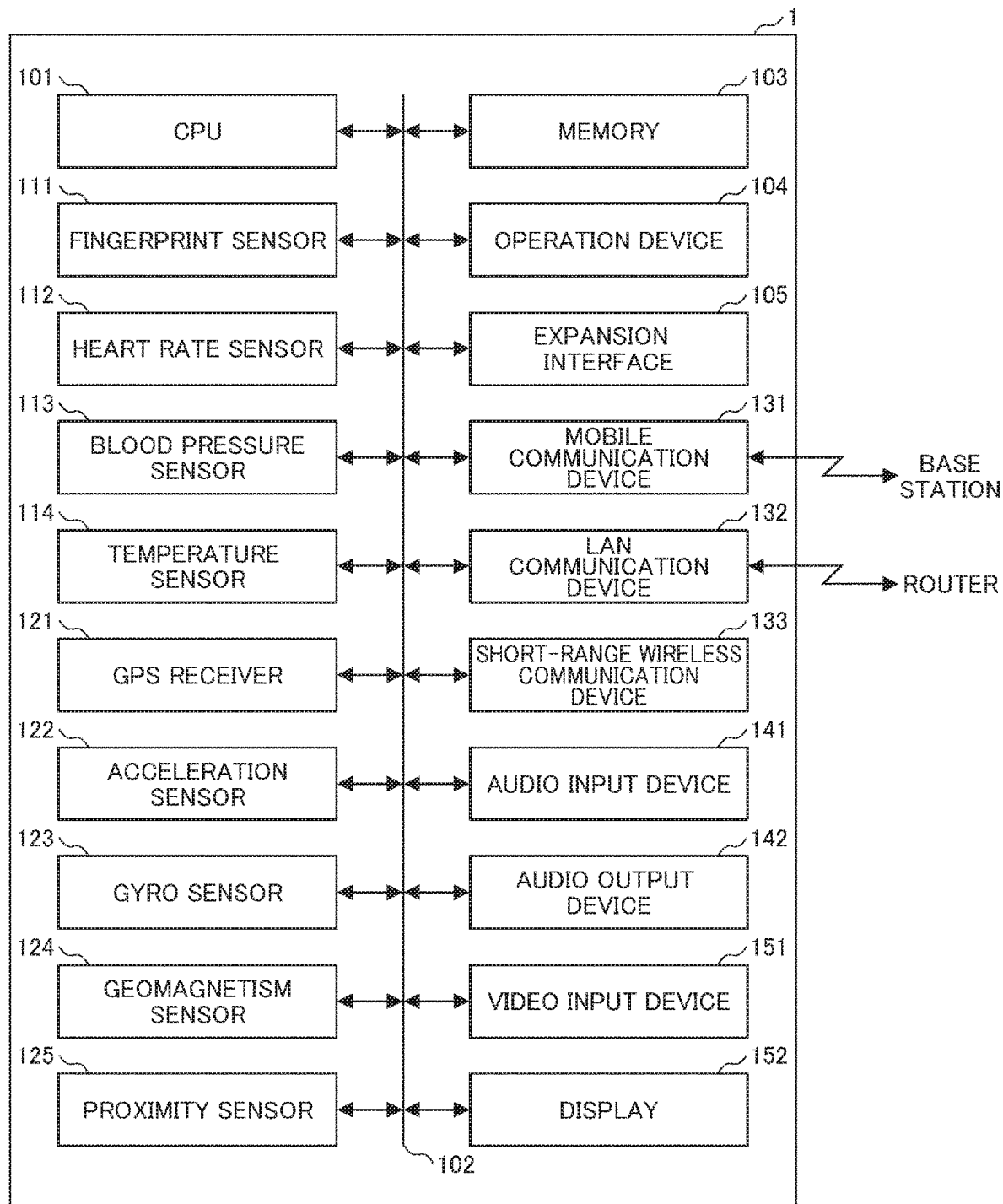
FIG. 2 is a hardware configuration diagram illustrating the handheld device according to the first embodiment.

Hereinafter, exemplary embodiments of the present invention will be described with reference to the appended drawings.

First Embodiment

FIG. 1 is a configuration diagram illustrating a communication system including a handheld device 1 which is an example of an information processing device used in the present embodiment. The communication system according to the present embodiment is configured with the handheld device 1 worn on the body of the user, a base station 5 of a mobile telephone communication network, a wide area public network 6 such as the Internet, a router 7, and the like.

The handheld device 1 is a wristwatch-type handheld device having a communication function and can establish a connection with the base station 5 or the router 7 and acquire various kinds of information from the network 6. The handheld device 1 includes a fingerprint sensor 11 and a touch panel 12 installed on the surface thereof. Although not illustrated, the handheld device 1 includes a heart rate sensor, a blood pressure sensor, a temperature sensor, and the like which are installed on the back surface to come into contact with the wrist when the user wears it. In the present embodiment, the wristwatch-type handheld device is described as the handheld device 1, but the handheld device 1 may be a glasses-type handheld device or a ring-type handheld device. Further, the handheld device 1 may be any other portable digital device. Furthermore, an information processing device which is equipped with a sensor that detects dynamic biometric information may be used, and for example, a personal computer (PC) which is equipped with a temperature detection sensor using infrared rays and capable of detecting a body temperature of the user may be used instead of the handheld device.

The base station 5 is a device that performs a relay between the handheld device 1 and the network 6 and can perform transmission and reception of various kinds of information with the handheld device 1. The router 7 has a function of a wireless local area network (LAN) such as wireless fidelity (Wi-Fi) and can be connected to the network 6 via a communication line.

FIG. 2 is a hardware configuration diagram illustrating the handheld device 1 of the present embodiment. A central processing unit (CPU) 101 controls the handheld device 1 in general according to a predetermined program. The CPU 101 may be an arbitrary control circuit or a dedicated circuit such as an application specific IC (ASIC).

The system bus 102 is a data communication path in which transmission and reception of data are performed between the CPU 101 and the respective units of the handheld device 1.

The memory 103 is configured with a read only memory (ROM), a random access memory (RAM), a flash ROM, or the like, and stores a program and various kinds of setting information for controlling the handheld device 1, an application program (hereinafter, referred to as an "application"), biometric information of the user, and the like.

The operation device 104 is an input device used to input an operation instruction to the handheld device 1, and in the present embodiment, the operation device 104 is configured with a touch panel and a button switch which is arranged to be superimposed on a display device 152 (which will be described later). Further, one of the touch panel and the button switch may be arranged. Furthermore, the handheld device 1 may be operated using a keyboard or the like which is connected to an expansion interface (I/F) 105 (which will be described later). Moreover, the handheld device 1 may be operated using a separate information terminal device connected via wired communication or wireless communication. The display device 152 may have the touch panel function.

The expansion interface 105 is a group of interfaces for expanding the function of the handheld device 1, and in the present embodiment, the expansion interface 105 is configured with a video/audio interface, a universal serial bus (USB) interface, a memory interface, or the like. The video/audio interface receives a video signal or an audio signal from an external video/audio output device and outputs a video signal or an audio signal to the external video/audio output device. The USB interface establishes a connection with a keyboard or any other USB device. The memory interface is connected to a memory card or any other memory medium and performs transmission reception of data.

The fingerprint sensor 111 is a sensor that detects static biometric information of the user who uses the handheld device 1, and detects a fingerprint pattern when the user touches with a finger, compares the detected fingerprint pattern with a fingerprint pattern of the authorized user registered in the memory 103, and performs user authentication according to whether or not the fingerprint patterns are identical to each other.

A heart rate sensor 112, a blood pressure sensor 113, and a temperature sensor 114 are a group of sensors for detecting the dynamic biometric information of the user who wears the handheld device 1, and detects the current state of the user by measuring the heart rate, the blood pressure, the body temperature, and the like through the group of sensors and comparing the heart rate, the blood pressure, the body temperature, and the like which are measured with measured values of the authorized user in the normal state which are registered in the memory 103 in advance. Further, any other sensor may be installed.

A global positioning system (GPS) receiver 121, an acceleration sensor 122, a gyro sensor 123, a geomagnetism sensor 124, and a proximity sensor 125 are a group of sensors for detecting the state of the handheld device 1, and it is possible to detect a position, a motion, an inclination, a direction, an approach state of an object therearound, and the like through the group of sensors. Further, any other sensor may be installed.

A mobile communication device 131 is configured with an antenna and communication circuits including as an encoding circuit and a decoding circuit, and performs telephone communication (call) and transmission reception of data through wireless communication with the base station 5 of the mobile telephone communication network. The LAN communication device 132 is connected to a wireless communication access point through wireless communication and performs transmission reception of data. A short-range wireless communication device 133 performs wireless communication with a peripheral device in a short range. For example, Bluetooth (registered trademark), infrared rays, Wi-Fi direct, or the like is used as the short-range wireless communication. Each of the LAN communication device 132 and the short-range wireless communication device 133 includes an encoding circuit, a decoding circuit, an antenna, and the like.

An audio input device 141 and an audio output device 142 are audio processing devices of the handheld device 1. The audio input device 141 is a microphone and converts a voice of the user or the like into audio data and receives it. The audio output device 142 is a speaker and provides an audio signal to the user of the handheld device 1.

A video input device 151 and the display device 152 are video processing devices of the handheld device 1. The video input device 151 is a camera unit that receives video data of a surrounding area or an object by converting light input from a lens into an electrical signal using an electronic device such as a charge coupled device (CCD) sensor or a complementary metal oxide semiconductor (CMOS) sensor. The display device 152 is a display such as a liquid crystal (LC) panel and provides a video signal to the user of the handheld device 1. The display device 152 includes a video RAM (not illustrated) and has a function of display a video based on video data input to the video RAM and performs format conversion, a process of superimposing a menu or other on screen display (OSD) signals, and the like as necessary.

The exemplary configuration of the handheld device 1 includes components which are not essential in the present embodiment, but effects of the present embodiment are obtained even through a configuration having no non-essential components. A component which is not illustrated such as a digital television broadcasting receiving function, an e-money payment function, or the like may be further added.

Figure 3:
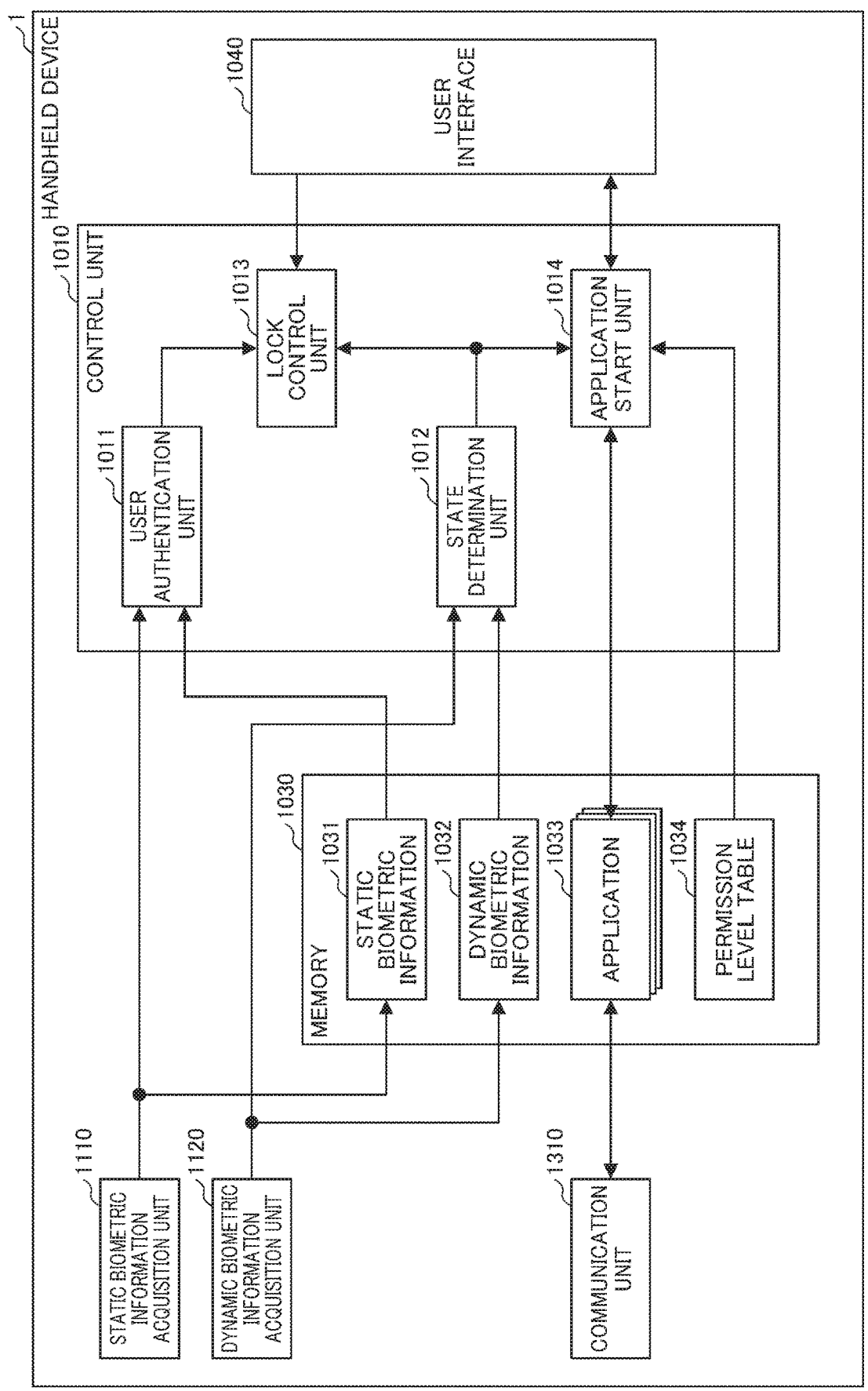
FIG. 3 is a functional block diagram illustrating the handheld device according to the first embodiment.

FIG. 3 is a functional block diagram illustrating the handheld device 1 of the present embodiment. Functional blocks of the handheld device 1 are controlled by the control unit 1010.

The control unit 1010 operates on the CPU 101 with which the handheld device 1 illustrated in FIG. 2 is equipped, includes a user authentication unit 1011, a state determination unit 1012, a lock control unit 1013, an application start unit 1014, and the like, and controls a memory 1030, a static biometric information acquisition unit 1110, a dynamic biometric information acquisition unit 1120, a communication unit 1310, or the like based on an instruction given from a user interface 1040 such that the static biometric information and the dynamic biometric information are acquired, stored, and compared, the handheld device 1 is locked or unlocked, or an application starts.

The user interface 1040 is configured with the operation device 104, the audio input device 141, the audio output device 142, the video input device 151, the display device 152, and the like which are illustrated in FIG. 2, and presents the user with various kinds of information and transfers the instruction of the user to the control unit 1010.

The static biometric information acquisition unit 1110 is configured with the fingerprint sensor 111 and the like which are illustrated in FIG. 2 and detects a fingerprint and the like which are the static biometric information of the user who uses the handheld device 1.

The dynamic biometric information acquisition unit 1120 is configured with the heart rate sensor 112, the blood pressure sensor 113, the temperature sensor 114, and the like which are illustrated in FIG. 2, and measures the heart rate, the blood pressure, the body temperature, and the like which are the dynamic biometric information of the user who wears the handheld device 1.

The communication unit 1310 is configured with the mobile communication device 131, the LAN communication device 132, the short-range wireless communication device 133, and the like which are illustrated in FIG. 2 and performs acquisition of an application and transmission reception of various kinds of data.

The memory 1030 is configured with the memory 103 and the like which are illustrated in FIG. 2, and stores static biometric information 1031, dynamic biometric information 1032, an application 1033, a permission level table 1034 which is a table of levels at which applications are permitted to start, and the like, in addition to the program and various kinds of setting information for controlling the handheld device 1.

The static biometric information 1031 is, for example, a fingerprint of the authorized user acquired through the static biometric information acquisition unit 1110. Before the handheld device 1 is used, the static biometric information of the authorized user is registered in advance.

The dynamic biometric information 1032 is, for example, the heart rate, the blood pressure, and the body temperature of the user acquired through the dynamic biometric information acquisition unit 1120. When the handheld device 1 is used, for example, the dynamic biometric information of the user in the normal state is measured and registered.

The application 1033 is an application program acquired through the communication unit 1310 or an application program which is pre-installed. A plurality of application programs can be registered, and an application permission level can be registered in the permission level table 1034 in association with each application program.

The user authentication unit 1011 determines whether or not the user is an authorized user by comparing the static biometric information acquired through the static biometric information acquisition unit 1110 when the handheld device 1 is used with the static biometric information 1031. When the user is authenticated to be the authorized user, the lock control unit 1013 is controlled such that the handheld device 1 is unlocked.

The lock control unit 1013 is controlled by the user authentication unit 1011 such that the lock control unit 1013 unlocks the handheld device 1, and, for example, when the user interface 1040 is not operated for a certain period of time, the lock control unit 1013 locks the handheld device 1. Further, even when the state determination unit 1012 is determined to be in a sleep state, the lock control unit 1013 locks the handheld device 1.

The state determination unit 1012 determines the state of the user by comparing the dynamic biometric information acquired through the dynamic biometric information acquisition unit 1120 when the handheld device 1 is used with the dynamic biometric information 1032, and controls the lock control unit 1013 and the application start unit 1014. For example, when the user is determined to be in the sleep state, the lock control unit 1013 is controlled such that the lock control unit 1013 locks the handheld device 1. Further, when the user is determined to be in the normal state, all applications are set to enter a startable state, and when the user is determined to be in a stress state, applications that can be started are limited. Applications to be limited are registered in the permission level table 1034. A start permission level of each application may be decided in advance and may be registered by the user through the user interface 1040.

An application to be started is not limited to the application 1033 stored in the memory 1030, and an application on the network 6 may be started through the communication unit 1310.

Figure 4:
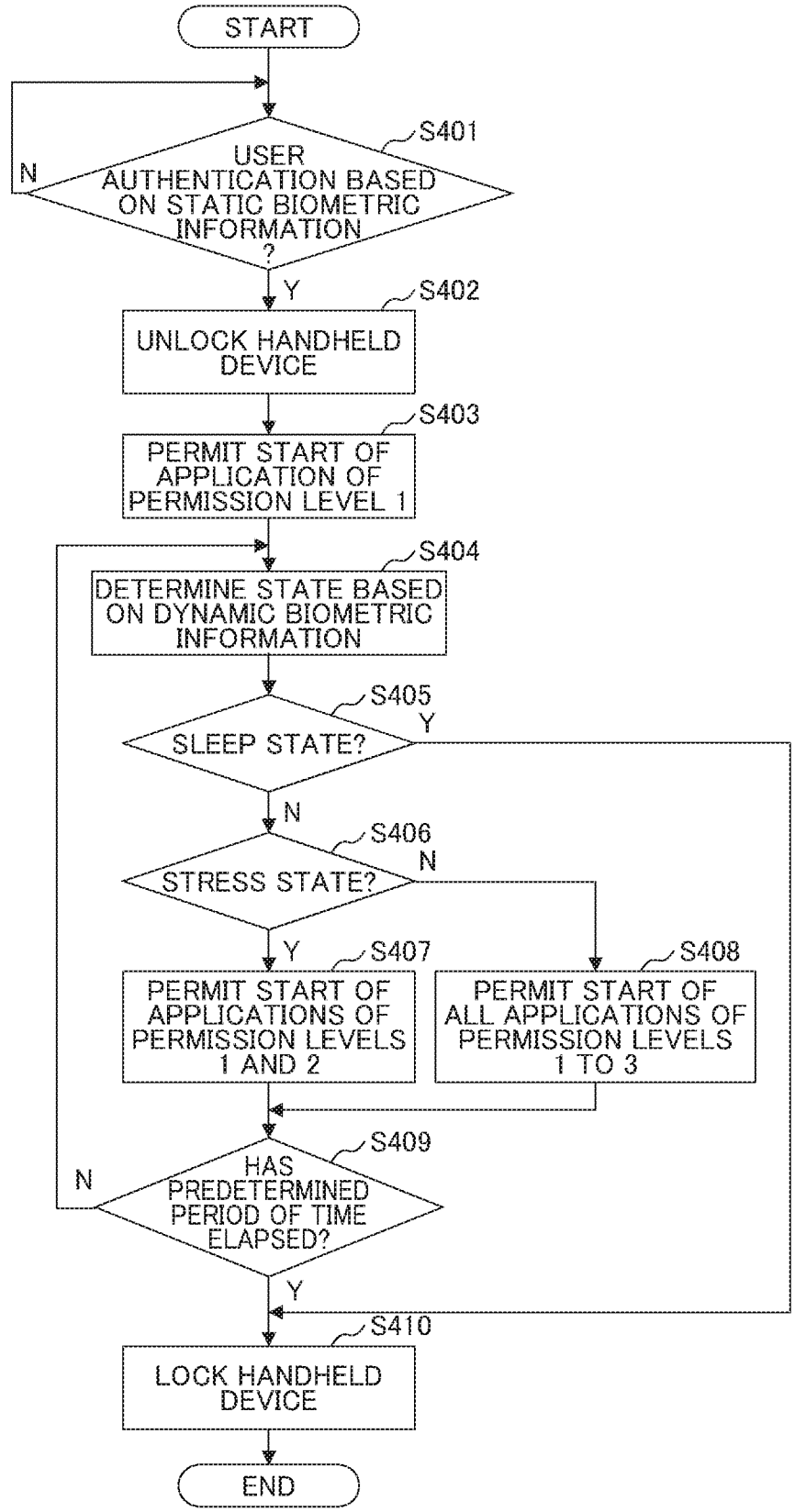
FIG. 4 is a flowchart illustrating an application permission operation of the handheld device according to the first embodiment.

FIG. 4 is a flowchart illustrating an application permission operation of the handheld device 1 of the present embodiment. This flowchart illustrates a process of performing the user authentication through the handheld device 1, checking the state of the user, and limiting an application to be started according to the state of the user. First, the static biometric information is detected, and the user authentication is performed. The static biometric information acquisition unit 1110 acquires the static biometric information, and the user authentication unit 1011 performs the user authentication as to whether or not the acquired static biometric information is identical to the static biometric information 1031 which is registered in advance by comparing the acquired static biometric information with the static biometric information 1031 (S401). For example, the fingerprint serving as the static biometric information is detected, the user authentication is performed, and when the detected fingerprint is determined to be identical to the registered fingerprint, the lock control unit 1013 unlocks the handheld device 1 (S402), and the application start unit 1014 permits a start of an application of the permission level 1 (S403).

For example, the application of the permission level 1 is an application that does not relate to information of the user him/herself and has no particular problem even when it is used by anyone else such as a clock application, a web browser, a map application, a camera application, a weather forecast application, a music application, a calculator application, a dictionary application, a game application, and a navigation application. The permission level of each application is registered in the permission level table 1034.

A display example of a screen of the handheld device 1 at this time is illustrated in FIG. 5A. The clock application, the web browser, the map application, the calculator application, and the dictionary application are the applications of the permission level 1 and thus are in the startable state, and the other applications have a different icon color which indicates that they are in the non-startable state.

The user authentication may be performed through any other biometric authentication such as a vein authentication, a face authentication, an iris authentication, or a retina authentication, in addition to the fingerprint authentication, and for example, when the handheld device 1 is worn on the wrist, the user authentication may be performed through the vein authentication for the part on which the handled device 1 is worn, so that a situation in which anyone else wears the handheld device 1 and pretends to be the authorized user can be prevented. Alternatively, the unlocking operation may be performed by inputting a passcode, and a pattern lock may be released by the trajectory of the finger.

Generally, there is no difference between a period of time in which the static biometric information for the fingerprint authentication, the vein authentication, the face authentication, the iris authentication, the retina authentication, or the like is acquired and a period of time in which the passcode is input, and a period of time taken until the application of the permission level 1 enters the startable state is about several seconds.

Then, the dynamic biometric information is detected, and the state of the user is determined. The state of the user is determined such that the dynamic biometric information acquisition unit 1120 acquires the dynamic biometric information, and the state determination unit 1012 compares the acquired dynamic biometric information with the dynamic biometric information 1032 that is registered in advance (S404).

For example, the heart rate, the blood pressure, and the body temperature which are the dynamic biometric information are measured in the normal state and registered in the dynamic biometric information 1032, the dynamic biometric information acquisition unit 1120 measures the heart rate, the blood pressure, and the body temperature, and when the heart rate, the blood pressure, and the body temperature are equal to or less than lower limit values in the normal state, the sleep state is determined. Further, for example, when the heart rate and the blood pressure are equal to or larger than upper limit values in the normal state, the stress state is determined, and a state which corresponds to neither the sleep state nor the stress state is determined to be the normal state.

Generally, a period of time in which the dynamic biometric information such as the heart rate, the blood pressure, the body temperature, the brain wave, or the amount of sweating is acquired is longer than a period of time in which the static biometric information is acquired, and a period of time taken until applications of permission levels 2 and 3 (which will be described later) enter the startable state is about several tends of seconds. For this reason, acquisition of the dynamic biometric information may start at the same time as when acquisition of the static biometric information starts, or the dynamic biometric information may be constantly acquired, and the state determination may be performed based on the biometric information obtained for previous 30 seconds.

First, the process is switched according to whether or not the state of the user is the sleep state (S405). When the state of the user is determined to be the sleep state, the handheld device 1 is locked (S410), and the process ends (the permission level 0). For example, when the user is asleep in a station, a park, or the like, although another person causes the handheld device 1 to touch the finger of the user and perform the fingerprint authentication, if the heart rate, the blood pressure, and the body temperature are equal to or less than the lower limit values in the normal state, the state of the user is determined to be the sleep state, and thus the handheld device 1 can be locked.

When the state of the user is determined not to be the sleep state, the process is switched according to whether or not the state of the user is the stress state (S406). When the state of the user is determined to be the stress stat, the applications of the permission levels 1 and 2 are permitted to be started (S407).

For example, the application of the permission level 2 is an application that relates to the user him/herself and is considered to have a problem when it is used by anyone else such as a schedule application, a mail application, a photo application, a telephone application, or an address book application. The application of the permission level 2 is an application which is considered to have no particular problem regardless of the state of the user when the user is the authorized user. A display example of a screen of the handheld device 1 at this time is illustrated in FIG. 5B. In addition to the fact that the applications of the permission level 1 are in the startable state, the schedule application and the mail application are the applications of the permission level and thus are in the startable state, and the other applications have a different icon color which indicates that they are in the non-startable state.

When the state of the user is determined not to be the stress state (determined to be the normal state), all applications of the permission levels 1 to 3 are permitted to be started (S408).

For example, the application of the permission level 3 is an application that relates to information of the user him/herself and is considered to have a big problem when it is used by anyone else such as an e-money application or an online banking application. The application of the permission level 3 is an application which is considered to have a problem depending on the state of the user even when the user is the authorized user.

For example, when the user is panicked and unable to make conscious determination due to a bank transfer fraud or the like or when the user is coercive to perform an operation by another person, if the heart rate and the blood pressure are equal to or larger than the upper limit values in the normal state, the state of the user is determined to be the stress state, and the e-money application, the online banking application, and the like can be set not to be started.

FIG. 5C illustrates a display example of the screen of the handheld device 1 when all applications are permitted to be started. In addition to the fact that the application of the permission level 1 and the application of the permission level 2 are in the startable state, the e-money application and the online banking application are the applications of the permission level 3 and thus are in the startable state, and it is indicated that all applications are in the startable state.

Then, the process is switched according to whether or not a predetermined period of time has elapsed while the user does not perform an operation (S409). When a predetermined period of time (for example, 10 seconds) has elapsed, the handheld device 1 is locked (S410), and the process ends.

When a predetermined period of time has not elapsed, the process returns to step S404, and the process is continued. For example, when the state of the user is determined to be the stress state, and the application of the permission level 3 enters the non-startable state, if the state of the user returns to the normal state later, all applications enter the startable state. Thereafter, when the state of the user is determined to be the stress state again, the application of the permission level 3 enters the non-startable state, and when the state of the user is determined to be the sleep state, the handheld device 1 is locked.

The permission level of each application may be decided in advance by the handheld device 1 or may be set to be changed by the user.

The upper limit values and the lower limit values of the heart rate, the body temperature, and the blood pressure in the normal state may be decided in advance by the handheld device 1, but when the heart rate, the body temperature, and the blood pressure of the user are measured and learned, and the upper limit values and the lower limit values are obtained based on them, more accurate determination can be performed.

Commonly, in the sleep state, the heart rate, the blood pressure, and the body temperature decrease, and in the stress state, the heart rate and the blood pressure increase, but when the user measures and registers the heart rate, the body temperature, and the blood pressure in the sleep state and the stress state in advance, more accurate determination can be performed. Further, even when anyone else wears the handheld device 1 and causes the handheld device 1 to touch the finger of the authorized user and perform the fingerprint authentication, the heart rate, the body temperature, and the blood pressure are detected to be different from a tendency toward previous measured values of the authorized user, and in this case, the handheld device 1 may be locked.

The determination of the state of the user may be performed based on other dynamic biometric information such as the brain wave or the amount of sweating in addition to the heart rate, the blood pressure, and the body temperature.

Further, the terminal device 1 may perform the user authentication based on the dynamic biometric information obtained from a heart rate waveform, a brain wave, or the like instead of the static biometric information obtained from the fingerprint or the like.

As described above, according to the present embodiment, an application software start-up method of an information processing device includes performing user authentication based on static biometric information, determining a state of a user by comparing dynamic biometric information acquired from a body of the user with dynamic biometric information which is measured in advance, and limiting application software to be started according to the determined state of the user based on a permission level which is set to each application software in advance. Further, the information processing device is forcibly locked according to the determined state of the user.

Further, an information processing device includes a static biometric information acquisition unit that acquires static biometric information, a user authentication unit that performs user authentication by comparing the acquired static biometric information with static biometric information which is registered in advance, a dynamic biometric information acquisition unit that acquires dynamic biometric information from a body of the user, a state determination unit that determines a state of the user by comparing the acquired dynamic biometric information which is measured in advance, a lock control unit that unlocks the information processing device through the authentication of the user authentication unit, and an application start unit that starts application software which is selected by the user among a plurality of pieces of application software, wherein the application start unit limits application software to be started according to the state of the user determined by the state determination unit based on a permission level which is set to each application software in advance. Further, the lock control unit forcibly locks the information processing device according to the state of the user determined by the state determination unit.

Accordingly, in the present embodiment, it is determines whether or not the user is the authorized user based on the static biometric information, the state of the user is determined based on the dynamic biometric authentication, and the start of an application is limited stepwise according to the state of the user. Thus, when determination of the user is suspected, it is possible to limit the start of the specific application, for example, when it is against the user's will.

Second Embodiment

Figure 6:
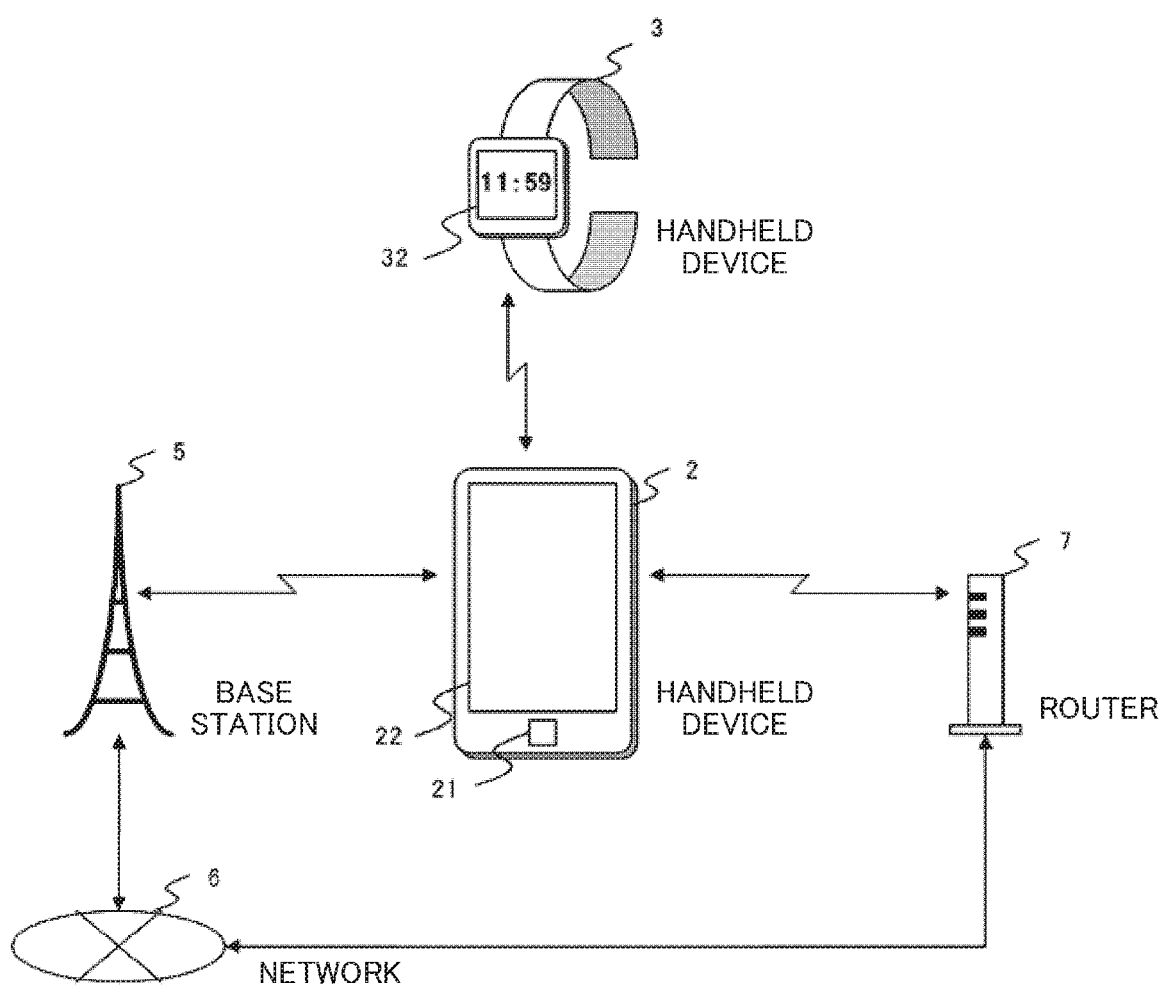
FIG. 6 is a configuration diagram illustrating a communication system including a handheld device according to a second embodiment.

FIG. 6 is a configuration diagram illustrating a communication system including a handheld device 2 and a handheld device 3 according to the present embodiment. The present communication system is configured with the handheld device 2, the handheld device 3 worn on the body of the user, a base station 5 such as a mobile telephone communication network, a wide area public network 6 such as the Internet, a router 7, and the like. The present embodiment is an example in which functions are divided such that the sensors for detecting the dynamic biometric information in the handheld device 1 according to the first embodiment, for example, a heart rate sensor 312, a blood pressure sensor 313, a temperature sensor 314, and the like are installed in the handheld device 3, and the other functions of the handheld device 1 are implemented in the handheld device 2.

In FIG. 6, the handheld device 2 is a smart phone. The handheld device 2 includes a fingerprint sensor 21 and a touch panel 22 installed on the surface thereof. The handheld device 2 can establish a connection with the base station 5 or the router 7 and acquire various kinds of information from the network 6. In the present embodiment, the smart phone is described as the handheld device 2, but the handheld device 2 may be a mobile phone, a tablet terminal, or the like or may be a personal digital assistants (PDA) or a laptop personal computer (PC). Further, the handheld device 2 may be a music player, a digital camera, a portable game machine, or the like having a communication function or an information processing device including any other digital device.

The handheld device 3 is a wristwatch-type handheld device having a communication function and has a function of performing transmission reception of various kinds of information with the handheld device 2. The handheld device 3 includes a touch panel 32 installed on the surface thereof. Although not illustrated, the handheld device 1 includes a heart rate sensor, a blood pressure sensor, a temperature sensor, and the like which are installed on the back surface to come into contact with the wrist when the user wears it. In the present embodiment, the wristwatch-type handheld device is described as the handheld device 3, but the handheld device 1 may be a glasses-type handheld device or a ring-type handheld device. Further, the handheld device 1 may be any other portable digital device.

Figure 7:
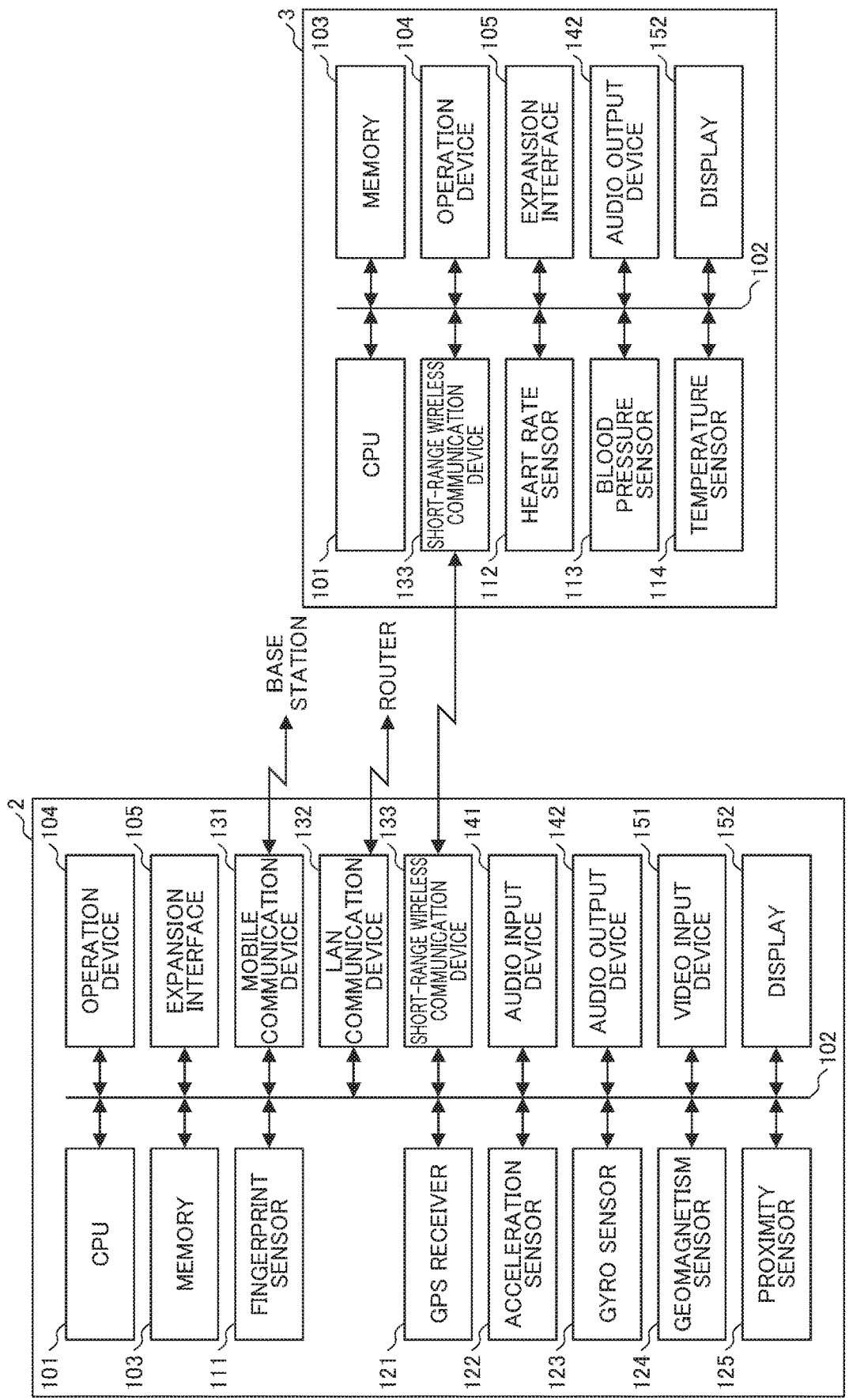
FIG. 7 is a hardware configuration diagram illustrating the handheld device according to the second embodiment.

FIG. 7 is a hardware configuration diagram illustrating the handheld device 2 and the handheld device 3 according to the present embodiment. In FIG. 7, the same components as those in FIG. 2 which is a hardware configuration diagram illustrating the handheld device 1 according to the first embodiment are denoted by the same reference numerals. In FIG. 7, components of the handheld device 2 is similar to the components obtained by excluding the heart rate sensor 112, the blood pressure sensor 113, and the temperature sensor 114 from the components of FIG. 2, and a description of the components is omitted. Further, components of the handheld device 3 are similar to the components described above with reference to FIG. 2, and thus a description of the components is omitted.

The heart rate sensor 312, the blood pressure sensor 313, and the temperature sensor 314 of the handheld device 3 are a group of sensors for detecting the state of the user who wears the handheld device 3 and can detect, for example, the heart rate, the blood pressure, and the body temperature of the user through the group of sensors. Further, any other sensor may be installed. The handheld device 3 transmits the detected data to the handheld device 2 through the short-range wireless communication device 133. The handheld device 2 can receive the detected data through the short-range wireless communication device 133 and detect the state of the user who wears the handheld device 3. The handheld device 2 and the handheld device 3 are assumed to be in an authenticated state.

The exemplary configurations of the handheld devices 2 and 3 illustrated in FIG. 7 includes components which are not essential in the present embodiment, but effects of the present embodiment are obtained even through a configuration having no non-essential components. A component which is not illustrated such as a digital television broadcasting receiving function, an e-money payment function, or the like may be further added.

Figure 8:
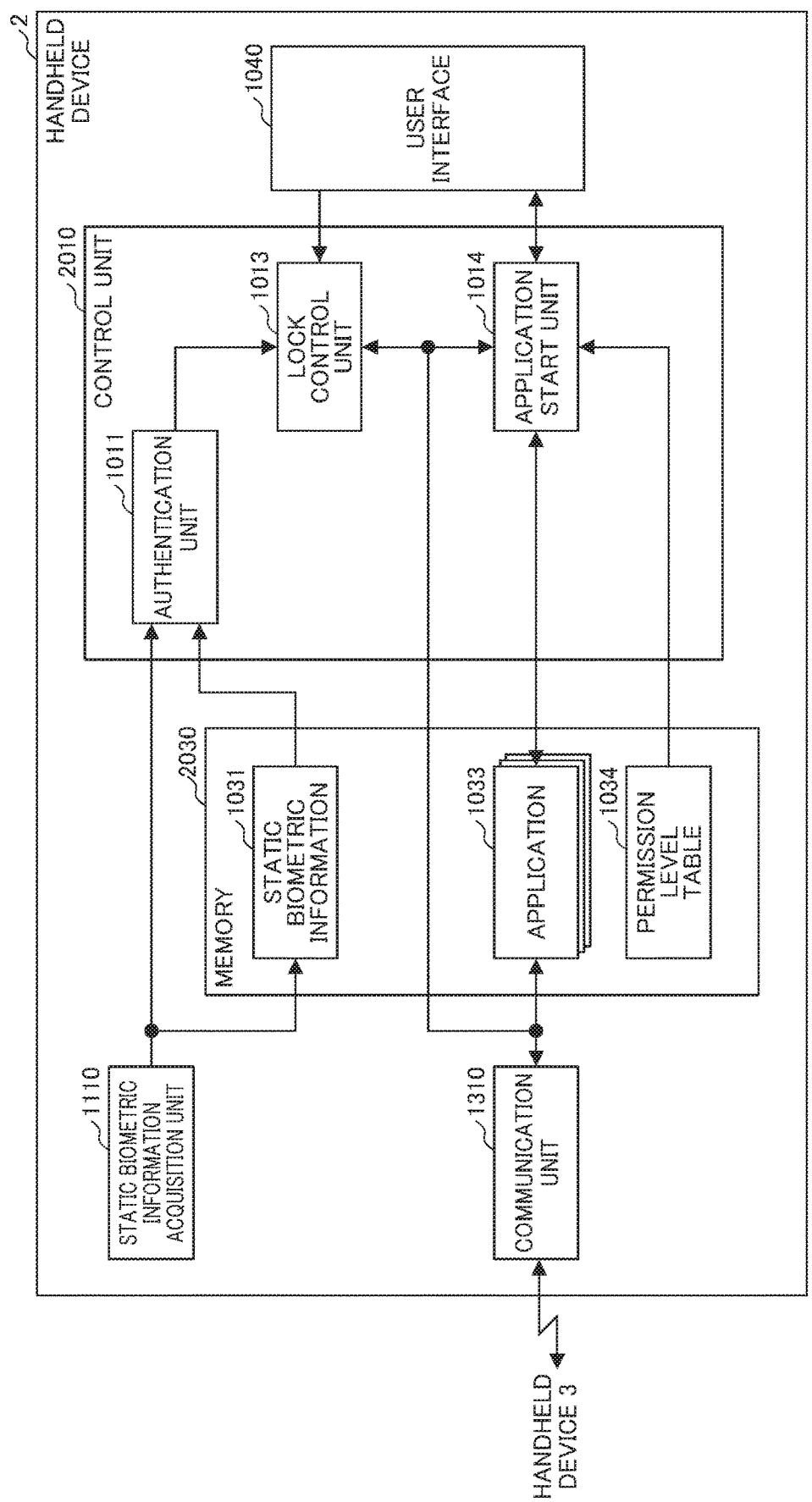
FIG. 8 is a functional block diagram illustrating the handheld device according to the second embodiment.

FIG. 8 is a functional block diagram illustrating the handheld device 2 according to the present embodiment. In FIG. 8, the same components as those in FIG. 3 which is a functional block diagram illustrating the handheld device 1 according to the first embodiment are denoted by the same reference numerals.

In FIG. 8, the components of the handheld device 2 are similar to the components obtained by excluding the dynamic biometric information acquisition unit 1120, the dynamic biometric information memory 1032, and the state determination unit 1012 from the components of FIG. 3, and thus a description of the same components as in FIG. 3 is omitted.

The functional blocks of the handheld device 2 are controlled by the control unit 2010. The control unit 2010 operates on the CPU 101 with which the handheld device 2 illustrated in FIG. 8 is equipped, includes the user authentication unit 1011, the lock control unit 1013, the application start unit 1014, and the like, and controls a memory 2030, the static biometric information acquisition unit 1110, the communication unit 1310, and the like based on an instruction given from the user interface 1040 such that the static biometric information is acquired, stored, and compared, the handheld device 2 is locked or unlocked, or an application starts.

The memory 2030 is configured with the memory 103 and the like which are illustrated in FIG. 7, and stores static biometric information 1031, an application 1033, a permission level table 1034 which is a table of levels at which applications are permitted to start, and the like, in addition to the program and various kinds of setting information for controlling the handheld device 2.

The communication with the handheld device 3 is performed through the short-range wireless communication device 133.

Figure 9:
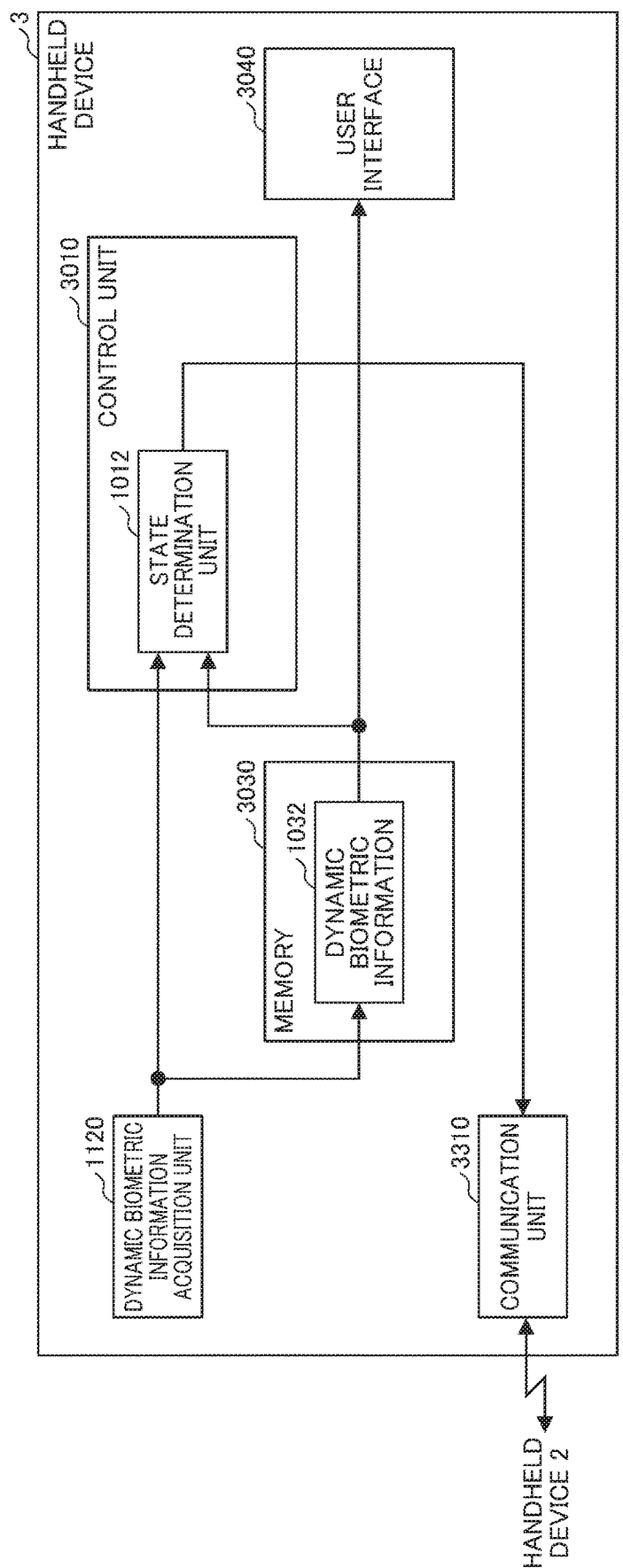
FIG. 9 is a functional block diagram illustrating the handheld device according to the second embodiment.

FIG. 9 is a functional block diagram illustrating the handheld device 3 according to the present embodiment. In FIG. 9, the same components as those in FIG. 3 which is a functional block diagram illustrating the handheld device 1 according to the first embodiment are denoted by the same reference numerals. In FIG. 9, the components of the handheld device 3 include the dynamic biometric information acquisition unit 1120, the dynamic biometric information memory 1032, and the state determination unit 1012 among the components of FIG. 3, and thus a detailed description thereof is omitted.

The functional blocks of the handheld device 3 are controlled by the control unit 3010. The control unit 3010 operates on the CPU 101 with which the handheld device 3 illustrated in FIG. 7 is equipped, includes the state determination unit 1012 and the like, and controls the dynamic biometric information acquisition unit 1120, a memory 3030, a communication unit 3310, and the like based on an instruction given from a user interface 3040 such that the dynamic biometric information is acquired, stored, transmitted, and displayed.

The user interface 3040 is configured with the operation device 104, the audio output device 142, the display device 152, and the like which are illustrated in FIG. 7, and presents the user with various kinds of information and transfers the instruction of the user to the control unit 3010.

The communication unit 3310 is configured with a short-range wireless communication device 333 and the like which are illustrated in FIG. 7 and performs communication with the handheld device 2.

The memory 3030 is configured with the memory 103 and the like which are illustrated in FIG. 7, and stores a program and various kinds of setting information for controlling the handheld device 3.

The state determination unit 1012 determines the state of the user by comparing the dynamic biometric information acquired through the dynamic biometric information acquisition unit 1120 when the handheld device 3 is used with the dynamic biometric information 1032, and transmits the state of the user to the handheld device 2 through the communication unit 3310.

For example, when the user is determined to be in the sleep state, the sleep state is transmitted to the handheld device 2 through the communication unit 3310, so that the handheld device 2 is locked. Further, an application to be started in the handheld device 2 is limited according to the state of the user. Further, when the user is determined to be in the normal state, all applications are set to enter the startable state, and when the user is determined to be in the stress state, applications that can be started are limited.

Figure 10:
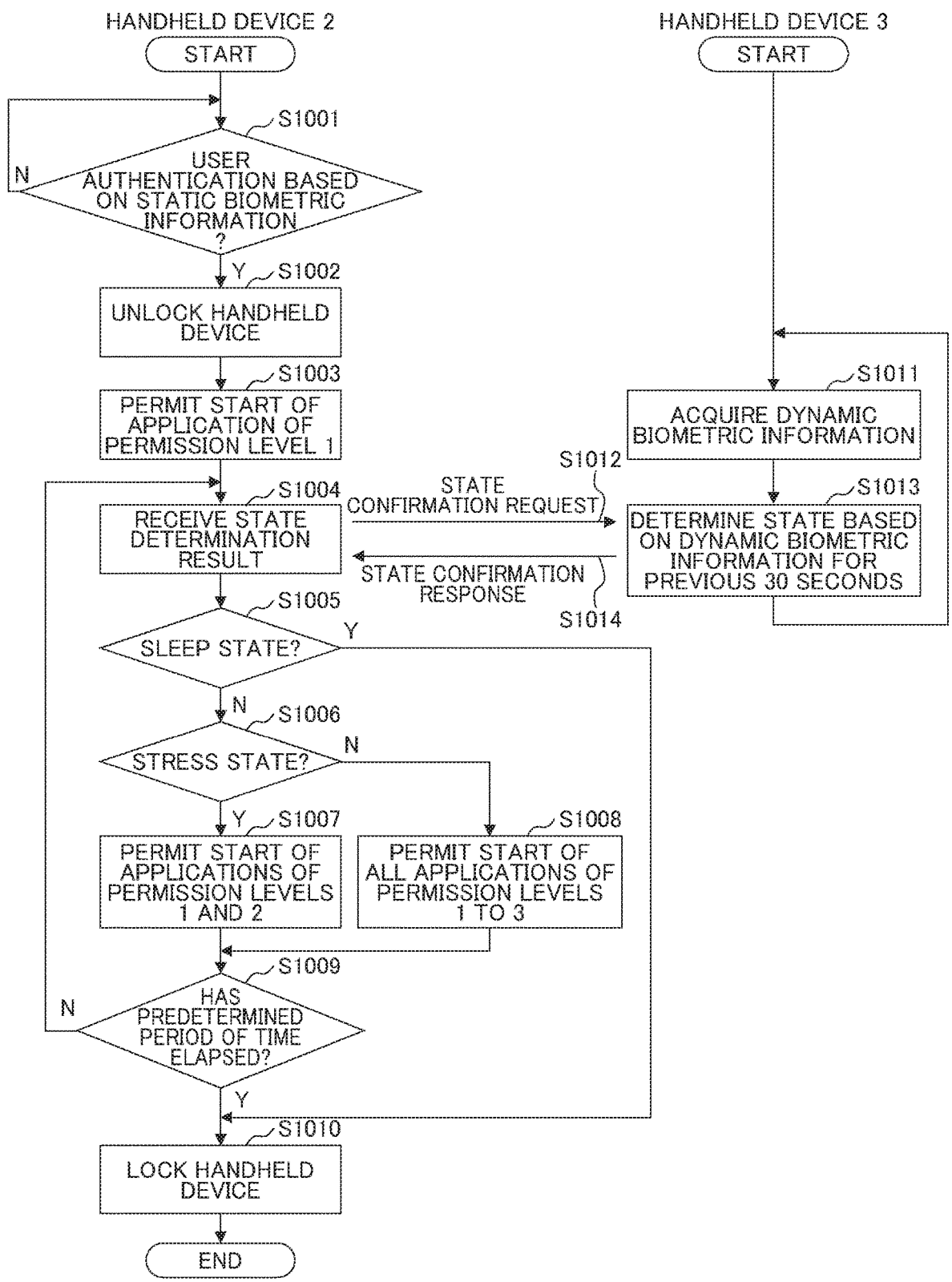
FIG. 10 is a flowchart illustrating an application permission operation of the handheld device according to the second embodiment.

FIG. 10 is a flowchart illustrating an application permission operation of the handheld devices 2 and 3 of the present embodiment. This flowchart illustrates a process of performing the user authentication through the handheld device 2, checking the state of the user through the handheld device 3, and limiting an application to be started according to the state of the user.

First, the handheld device 2 detects the static biometric information, and performs the user authentication (S1001). For example, it is determined whether or not the user is the authorized user through the fingerprint authentication. In other words, a fingerprint pattern detected when the user touches the fingerprint sensor 211 with the finger is compared with the fingerprint pattern of the user registered in the memory 203, and it is determined whether or not the two fingerprints are identical to each other. When the two fingerprints are determined to be identical to each other, the handheld device 2 is unlocked (S1002), and the application of the permission level 1 is permitted to be started (S1003).

A display example of a screen of the handheld device 2 at this time is illustrated in FIG. 11A. The clock application, the web browser, the map application, the camera application, the weather forecast application, the music application, the calculator application, and the dictionary application are the applications of the permission level 1 and thus are in the startable state, and the other applications have a different icon color which indicates that they are in the non-startable state.

The user authentication may be performed through any other biometric authentication such as the vein authentication, the face authentication, the iris authentication, or the retina authentication, the unlocking operation may be performed by inputting a passcode, and a pattern lock may be released by the trajectory of the finger.

The handheld device 3 measures the heart rate through the heart rate sensor 312, measures the blood pressure through the blood pressure sensor 313, and measures the body temperature through the temperature sensor 314 (S1011).

The handheld device 2 requests the handheld device 3 to confirm the state of the user through a short-range wireless communication device 233 (S1012).

The handheld device 3 detects the dynamic biometric information, and determines the state of the user (S1013). For example, the state of the user is determined based on a result of measuring the heart rate, the blood pressure, and the body temperature. In other words, for example, when the heart rate, the blood pressure, and the body temperature measured through the heart rate sensor 312, the blood pressure sensor 313, the temperature sensor 114 of the handheld device 3 are equal to or less than the lower limit values in the normal state, the state of the user is determined to be the sleep state. Further, for example, when the heart rate and the blood pressure are equal to or larger than the upper limit values in the normal state, the state of the user is determined to be the stress state, and the state which corresponds to neither the sleep state nor the stress state is determined to be the normal state.

The handheld device 3 constantly acquires the dynamic biometric information, and performs, for example, the state determination based on the biometric information obtained for previous 30 seconds.

Then, the handheld device 3 transmits the state of the user to the handheld device 2 through the short-range wireless communication device 333 as a response (S1014).

The handheld device 2 switches the process according to whether or not the state of the user received through the short-range wireless communication device 233 is the sleep state (S1005). When the state of the user is determined to be the sleep state, the handheld device 2 is locked (S1010), and the process ends.

Further, even when the user does not wear the handheld device 3 or even when the terminal device 3 does not transmit the state of the user to the handheld device 2 as a response, the handheld device 2 is locked, and the process ends.

Steps S1006 to 1009 which are processes performed when the state of the user is determined not to be the sleep state are similar to steps S406 to 409 of FIG. 4 in the first embodiment, and thus a detailed description thereof is omitted.

A display example of the screen of the handheld device 2 when the applications of the permission levels 1 and 2 are permitted to be started in S1007 is illustrated in FIG. 11B. In addition to the fact that the applications of the permission level 1 are in the startable state, the schedule application, the mail application, the photo application, the telephone application, and the address book application are the applications of the permission level 2 and thus are in the startable state, and the other applications have a different icon color which indicates that they are in the non-startable state.

Figure 11C:
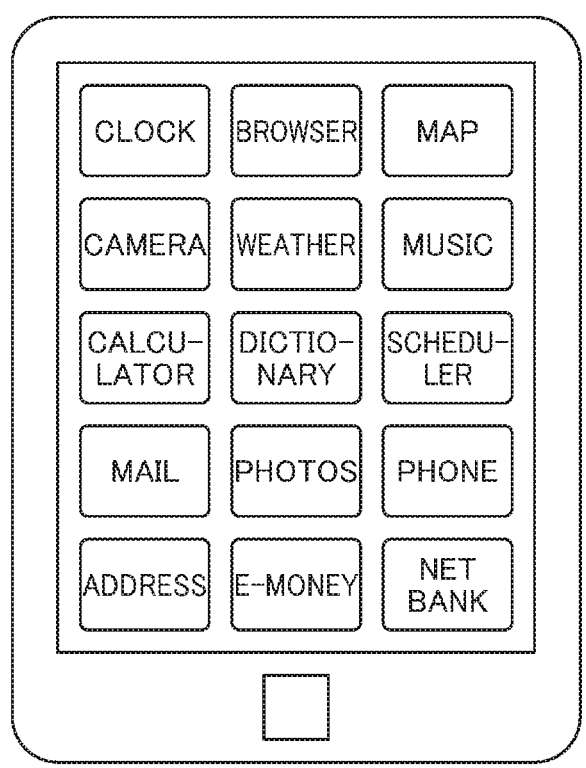

A display example of the screen of the handheld device 2 when all the applications of the permission levels 1 to 3 are permitted to be started in S1008 is illustrated in FIG. 11C. In addition to the fact that the applications of the permission levels 1 and 2 are in the startable state, the e-money application and the online banking application are the applications of the permission level 3 and thus are in the startable state, and it is indicated that all applications are in the startable state.

In the present embodiment, the handheld device 3 determines the state of the user, but the handheld device 3 may not determine the state of the user but transmit the measured values of the heart rate, the blood pressure, and the body temperature to the handheld device 2, and the handheld device 2 may determine the state of the user.

Further, the terminal device 2 may not perform the user authentication for the user, and the terminal device 3 may control whether or not the terminal device 2 is locked by performing the user authentication through the fingerprint authentication or the like and transmitting an authentication result to the terminal device 2. At this time, the terminal device 3 may perform the user authentication based on the dynamic biometric information obtained from the heart rate waveform, the brain wave, or the like rather than the static biometric information obtained from the fingerprint or the like.

In the present embodiment, the example in which the number of handheld devices is 2 has been described, but the number of handheld devices may be three or more, and the authentication function and the state determination function may be separated. In other words, the system including a plurality of handheld devices according to the present embodiment can be understood to be an application software start-up system including a plurality of information processing devices.

As described above, according to the present embodiment, an application software start-up method of an information processing device including a plurality of information processing devices includes performing, by at least one of the information processing devices, user authentication based on static biometric information of a body of a user, determining, by another information processing device, a state of a user by comparing dynamic biometric information acquired from the body of the user with dynamic biometric information which is measured in advance, and limiting application software to be started according to the determined state of the user based on a permission level which is set to each application software in advance.

Further, An application software start-up system includes first and second first information processing devices, the first information processing device includes a static biometric information acquisition unit that acquires static biometric information of a body, a user authentication unit that performs user authentication by comparing the acquired static biometric information with static biometric information which is registered in advance, a lock control unit that unlocks a handheld device through the authentication of the user authentication unit, an application start unit that starts application software which is selected by a user among a plurality of pieces of application software, and a first communication unit that receives a state of the user from the second information processing device, and the second information processing device includes a dynamic biometric information acquisition unit that acquires dynamic biometric information from the body of the user, a state determination unit that determines a state of the user by comparing the acquired dynamic biometric information which is measured in advance, and a second communication unit that transmits the determined state of the user to the first information processing device, wherein the application start unit limits application software to be started according to the state of the user received from the first communication unit based on a permission level which is set to each application software in advance.

Accordingly, in the present embodiment, the same effects as in the first embodiment are obtained, and when a plurality of handheld devices are registered in advance, and the user authentication function and the state determination function are distributed, each handheld device can be worn on a part of the body suitable for acquisition of each biometric information, and thus the handheld devices can be implemented in a form optimal for the respective functions.

Third Embodiment

Figure 12:
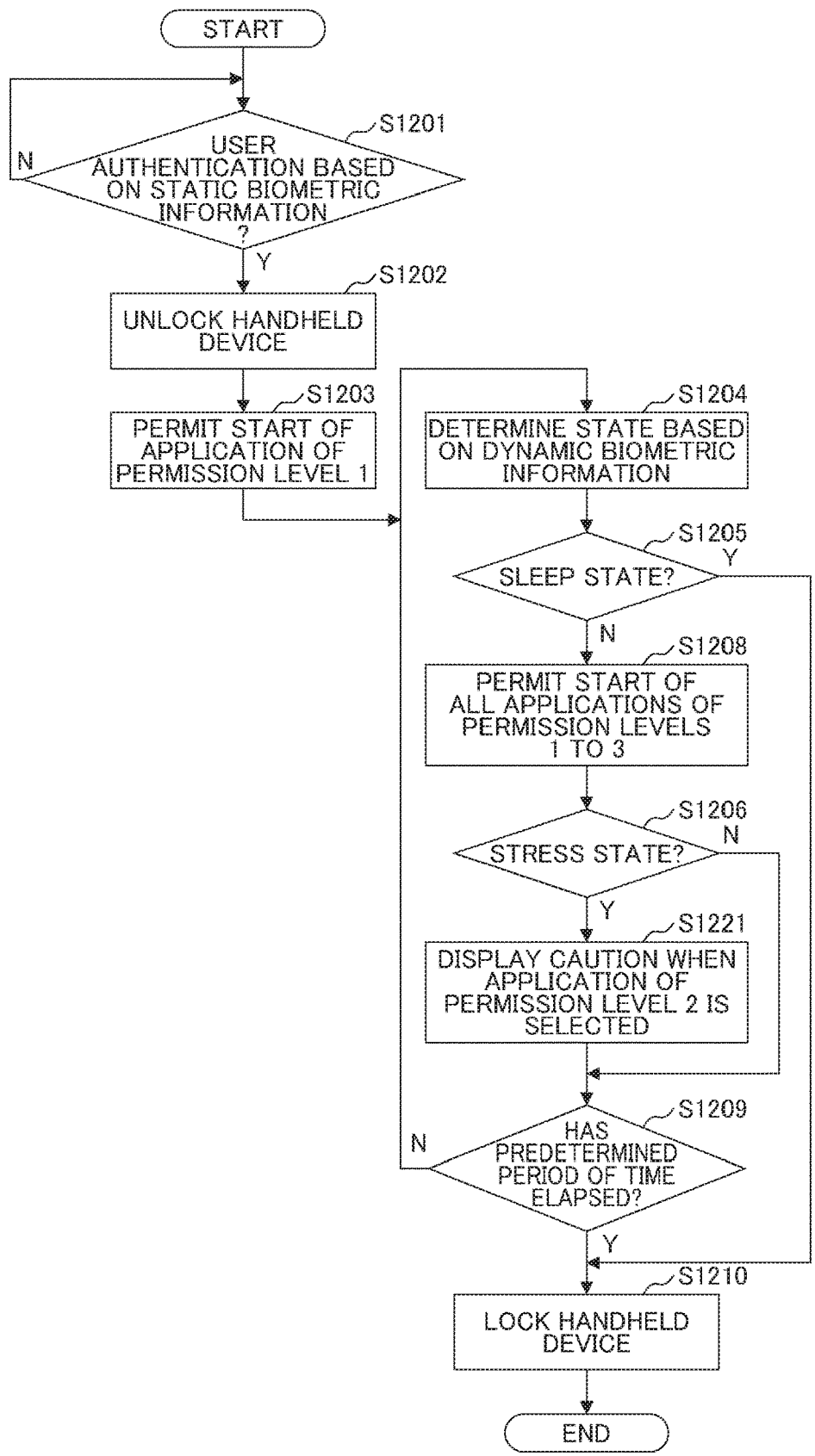
FIG. 12 is a flowchart illustrating an application permission operation of a handheld device according to a third embodiment.

FIG. 12 is a flowchart illustrating an application permission operation of the handheld device 1 of the present embodiment. In FIG. 12, steps S1201 to S1204 are similar to steps S401 to S404 of FIG. 4 in the first embodiment, and thus a description thereof is omitted.

In step S1205, the process is switched according to whether or not the state of the user is the sleep state. When the state of the user is determined to be the sleep state, the handheld device 1 is locked (S1210), and the process ends. When the state of the user is determined not to be the sleep state in step S1205, all the applications of the permission levels 1 to 3 are permitted to be started (S1208).

Here, the process is switched according to whether or not the state of the user is the stress state (S1206). When the state of the user is determined to be the stress stat, if the user selects the application of the permission level 3, a caution screen is displayed (S1221), and it is started only when the user confirms it. When the state of the user is determined not to be the stress state (determined to be the normal state), the caution screen is not displayed.

Figure 13:
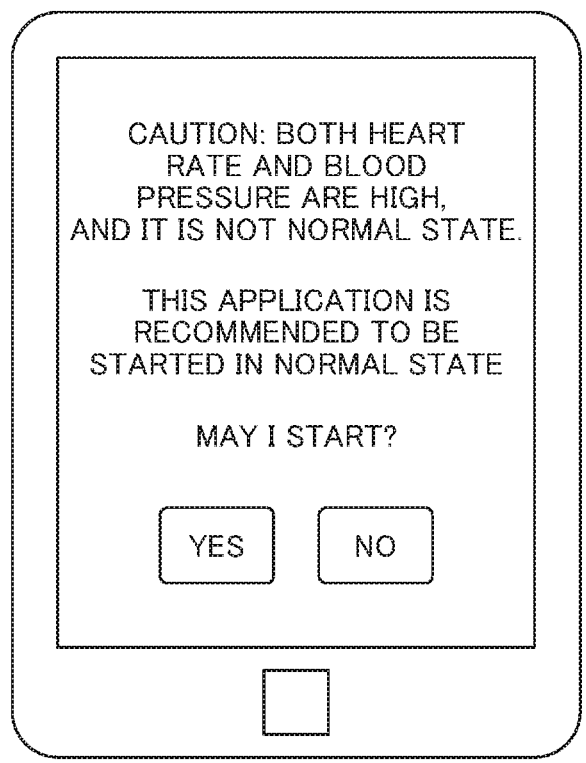
FIG. 13 illustrates a display screen of the handheld device according to the third embodiment.

For example, when the application of the permission level such as the e-money application or the online banking application is requested to be started, an application software start confirmation screen illustrated in FIG. 13 is displayed on the display device 152.

Steps S1209 to S1210 are similar to steps S409 to S410 of FIG. 4, and thus a description thereof is omitted.

The determination of the state of the user may be performed based on other dynamic biometric information such as the brain wave or the amount of sweating in addition to the heart rate, the blood pressure, and the body temperature.

In the present embodiment, the example in which the number of handheld devices is 1 has been described, but the number of handheld devices may be two or more, and the authentication function and the state determination function may be separated.

Through the above configuration, in the present embodiment, the same effects as in the first embodiment can be obtained, and since it is checked when a specific application is started according to the state of the user, for example, when determination of the user is suspected, it is possible to encourage reconsideration of the start of the specific application.

Fourth Embodiment

Figure 14:
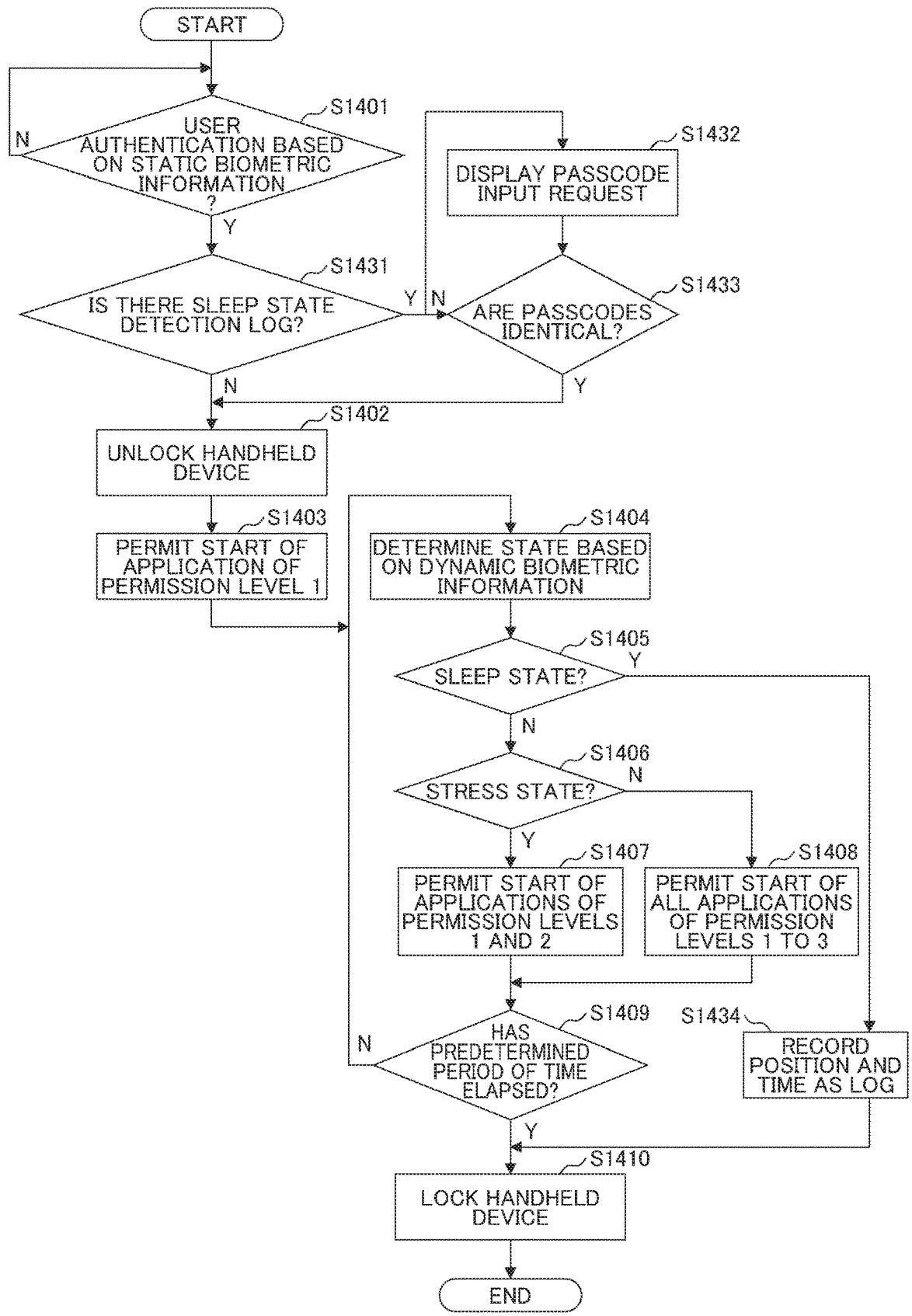
FIG. 14 is a flowchart illustrating an application permission operation of a handheld device according to a fourth embodiment.

FIG. 14 is a flowchart illustrating an application permission operation of the handheld device 1 of the present embodiment. In FIG. 14, steps S1401 to S1403 are similar to steps S401 to S403 of FIG. 4, and thus a process of inputting a passcode (S1431 to S1433) is added.

First, the static biometric information is detected, and the user authentication is performed. The static biometric information acquisition unit 1110 acquires the static biometric information, and the user authentication unit 1011 performs the user authentication as to whether or not the acquired static biometric information is identical to the static biometric information 1031 which is registered in advance by comparing the acquired static biometric information with the static biometric information 1031 (S1401). For example, the fingerprint serving as the static biometric information is detected, the user authentication is performed, and when the detected fingerprint is determined to be identical to the registered fingerprint, the process proceeds to step S1431. The user authentication may be performed through any other biometric authentication such as the vein authentication, the face authentication, the iris authentication, or the retina authentication, in addition to the fingerprint authentication.

Then, the process is switched according to whether or not a sleep state detection log (which will be described later) in the memory 103 (S1431). When there is no sleep state detection log, the process proceeds to step S1402, and the lock control unit 1013 unlocks the handheld device 1, and the application start unit 1014 permits the start of the application of the permission level 1 (S1403).

When there is a sleep state detection log, the process proceeds to step S1432, a passcode input request screen illustrated in FIG. 15 is displayed, and the process proceeds to step S1402 when a passcode which is information other than the biometric information input from the user interface 1040 such as the operation device 104 or the audio input device 141 is identical to a passcode which is set in advance in step S1433. A pattern lock may be released by the trajectory of the finger instead of the passcode.

Steps S1404 to S1410 are similar to step S404 to S410 of FIG. 4, but a process of recording the sleep state detection log (S1434) is added.

When the state of the user is determined to be in the sleep state in step S1405, since it is suspected that anyone else causes the handheld device 1 to touch the finger of the user and perform the user authentication, in step S1434, position information which is a place in which the user authentication is performed is specified through the GPS receiver 121 and recorded as a log together with time information, the handheld device 1 is locked (S1410), and the process ends. The log is recorded in the memory 103.

Further, in step S1434, a warning may be displayed on the display device 152, a vibrator for an incoming call may be operated, a photograph or a video may be captured through the video input device 151, attached to an e-mail together with the log, and transmitted to an address which is designated in advance.

In the present embodiment, the example in which the number of handheld devices is 1 has been described, but the number of handheld devices may be two or more, and the authentication function and the state determination function may be separated.

Through the above configuration, in the present embodiment, the same effects as in the first embodiment can be obtained, and when the handheld device is likely to be operated by anyone else, a warning is displayed, a photograph is captured, and a log is recorded, and thus it can be expected that a family member or anyone else is prevented from furtively looking at an e-mail. Further, when the log is recorded, it is necessary to input the passcode in order to lock the handheld device, and thus it is possible to prevent anyone else from performing the unlocking operation.

Fifth Embodiment

Figure 16:
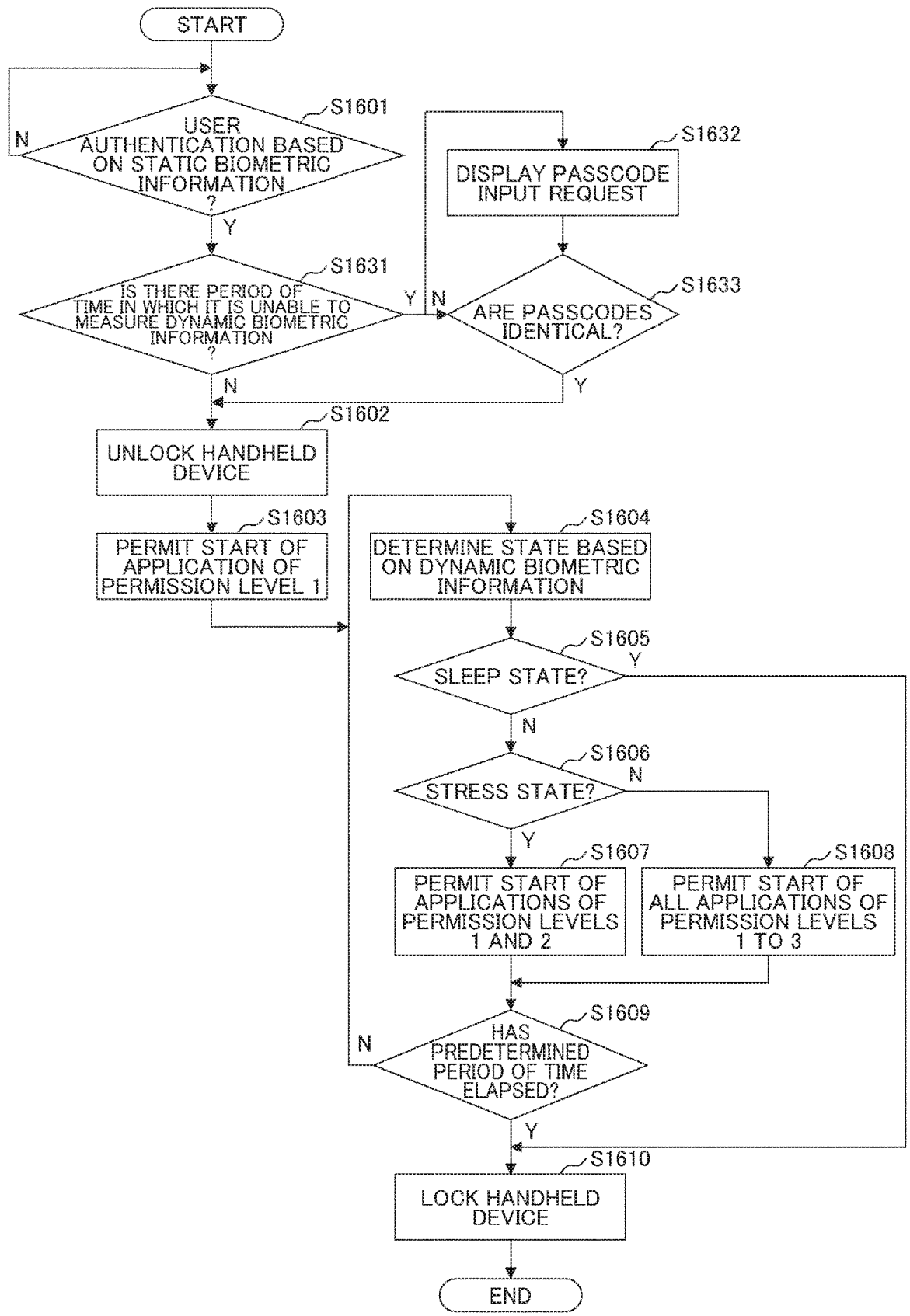
FIG. 16 is a flowchart illustrating an application permission operation of a handheld device according to a fifth embodiment.

FIG. 16 is a flowchart illustrating an application permission operation of the handheld device 1 of the present embodiment. In FIG. 16, steps S1601 to S1603 are similar to steps S401 to S403 of FIG. 4 in the first embodiment, and thus a process of inputting a passcode (S1631 to S1633) is added.

First, the static biometric information is detected, and the user authentication is performed. The static biometric information acquisition unit 1110 acquires the static biometric information, and the user authentication unit 1011 performs the user authentication as to whether or not the acquired static biometric information is identical to the static biometric information 1031 which is registered in advance by comparing the acquired static biometric information with the static biometric information 1031 (S1601). For example, the fingerprint serving as the static biometric information is detected, the user authentication is performed, and when the detected fingerprint is determined to be identical to the registered fingerprint, the process proceeds to step S1631. The user authentication may be performed through any other biometric authentication such as the vein authentication, the face authentication, the iris authentication, or the retina authentication, in addition to the fingerprint authentication.

Then, the process is switched according to whether or not there is a period of time in which it is unable to measure the dynamic biometric information after the handheld device 1 is previously unlocked (S1631). When there is not period of time in which it is unable to measure the dynamic biometric information, the process proceeds to step S1602, the lock control unit 1013 unlocks the handheld device 1, and the application start unit 1014 permits the start of the application of the permission level 1 (S1603).

When there is a period of time in which it is unable to measure the dynamic biometric information, since anyone else is likely to wear the handheld device 1, cause the handheld device 1 to touch the finger of the user, and perform the user authentication, the passcode input request screen illustrated in FIG. 15 is displayed on the handheld device 1, and when the input passcode is identical to the passcode which is set in advance in step S1633, the process proceeds to step S1602. A pattern lock may be released by the trajectory of the finger instead of the passcode.

Steps S1604 to S1610 are similar to step S404 to S410 of FIG. 4, and thus a description thereof is omitted.

In the present embodiment, the example in which the number of handheld devices is 1 has been described, but the number of handheld devices may be two or more, and the authentication function and the state determination function may be separated.

Through the above configuration, in the present embodiment, the same effects as in the first embodiment can be obtained, and when the handheld device is removed, it is necessary to input the passcode in order to unlock the handheld device next time, and thus it is possible to prevent anyone else from performing the unlocking operation.

Sixth Embodiment

Figure 17:
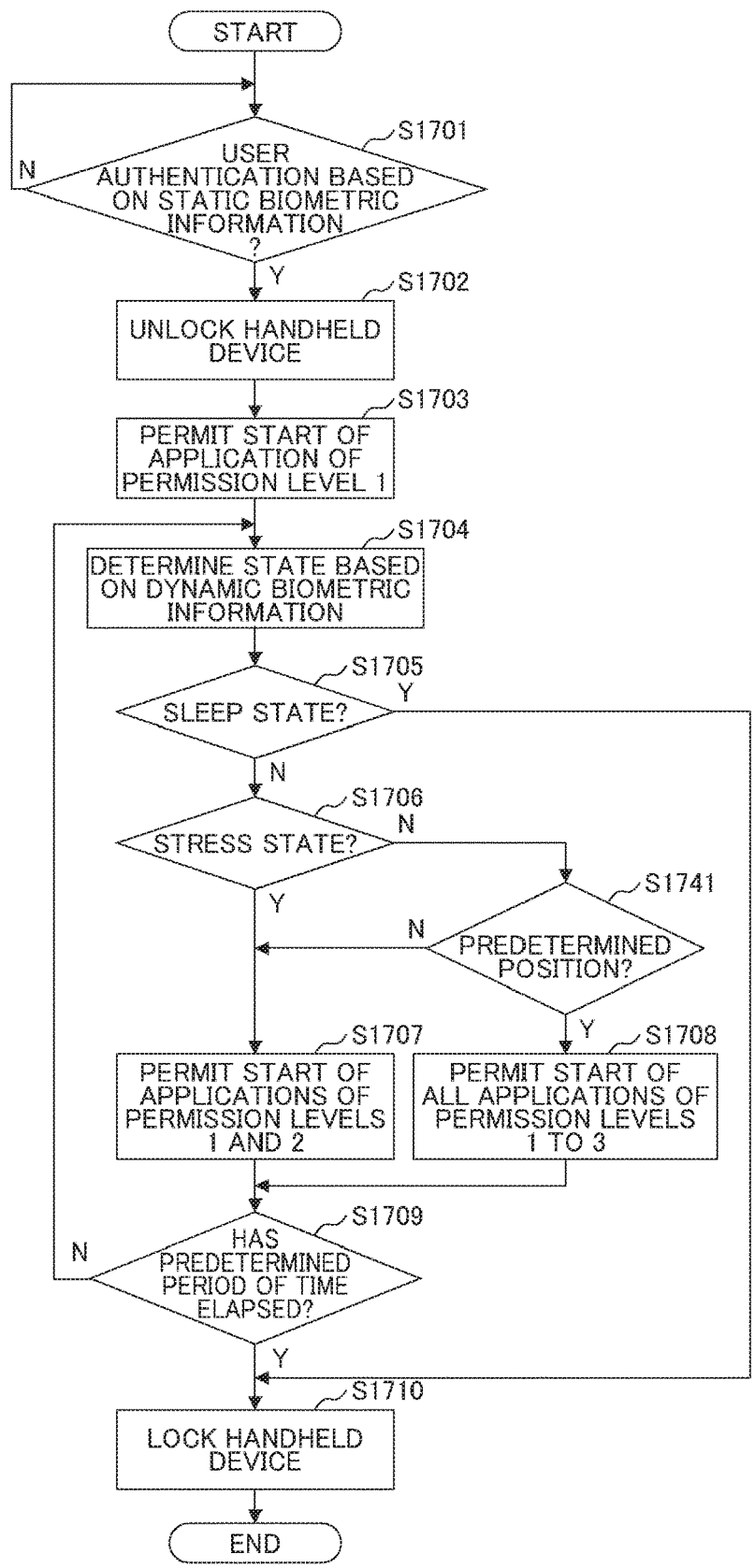
FIG. 17 is a flowchart illustrating an application permission operation of a handheld device according to a sixth embodiment.

FIG. 17 is a flowchart illustrating an application permission operation of the handheld device 1 of the present embodiment. In FIG. 17, steps S1701 to S1710 are similar to steps S401 to S410 of FIG. 4 in the first embodiment, and thus a process of switching an application according to a current position (S1741) is added.

In step S1706, the process is switched according to whether or not the state of the user is the stress state. When the state of the user is determined to be the stress state, the applications of the permission levels 1 and 2 are permitted to be started (S1707). When the state of the user is determined not to be the stress state (determined to be the normal state), the process is switched according to the current position of the handheld device 1 (S1741). The current position is specified through the GPS receiver 121, and when the current position is a predetermined position which is set in advance, all the applications of the permission levels 1 to are permitted to be started (S1708). The predetermined position is, for example, the user's home or company or the like. When the current position is not a predetermined position which is set in advance, the applications of the permission levels 1 and 2 are permitted to be started (S1707).

Alternatively, all the applications of the permission levels 1 to 3 may be permitted to be started at a predetermined timing which is set in advance.

Alternatively, a face photograph of the user may be registered, and all the applications of the permission levels 1 to 3 may be permitted to be started when a face is captured through the video input device 151, and the user is recognized. Alternatively, all the applications of the permission levels 1 to 3 may be permitted to be started when the user is recognized, but anyone else around the user except the user is not recognized.

The determination of the state of the user may be performed based on other dynamic biometric information such as the brain wave or the amount of sweating in addition to the heart rate, the blood pressure, and the body temperature.

In the present embodiment, the example in which the number of handheld devices is 1 has been described, but the number of handheld devices may be two or more, and the authentication function and the state determination function may be separated.

Through the above configuration, in the present embodiment, the same effects as in the first embodiment can be obtained, and a specific application is permitted to be started when the user is at a safe position which is set in advance, and thus it is possible to limit the start of the application at a place which is not assumed by the user.

The above embodiments have been described in detail in order to facilitate understanding of the present invention, and the present invention is not limited to one necessarily having all components described above. Further, a component of a certain embodiment may be replaced with a component of another embodiment, and a component of a certain embodiment may be added to a component of another embodiment. Furthermore, addition, deletion, or replacement of another component may be performed on a component of each embodiment.

Further, all or some of the components, the functions, processing units, the processing devices, and the like described above may be implemented by hardware, for example, may be designed by, for example, an integrated circuit (IC). Furthermore, each component, each function, or the like may be implemented by software by interpreting and executing a program that implements each function through a processor. Information such as a program that implements each function, a table, or a file may be stored in a memory, a recording device such as a hard disk or a solid state drive (SSD), or a recording medium such as an IC card or an SD card.

Further, control lines or information lines considered to be necessary for the sake of description are illustrated, and all control lines or information lines necessary in a product are not necessarily illustrated. Practically, most of components may be considered to be connected with one another.

REFERENCE SIGNS LIST 1, 2, 3 handheld device
5 base station
6 network
7 router
101 CPU
102 system bus
103 memory
104 operation device
105 expansion interface
111 fingerprint sensor
112 heart rate sensor
113 blood pressure sensor
114 temperature sensor
121 GPS receiver
122 acceleration sensor
123 gyro sensor
124 geomagnetism sensor
125 proximity sensor
131 mobile communication device
132 LAN communication device
133 short-range wireless communication device
141 audio input device
142 audio output device
151 video input device
152 display device
1010 control unit
1011 user authentication unit
1012 state determination unit
1013 lock control unit
1014 application start unit
1030 memory
1031 static biometric information
1032 dynamic biometric information
1033 application
1034 the permission level table
1040 user interface
1110 static biometric information acquisition unit
1120 dynamic biometric information acquisition unit
1310 communication unit

The invention claimed is:

1. An information processing device, comprising:
a memory;
a dynamic biometric information acquisition sensor that acquires dynamic biometric information from a body of a user;
a wireless communication interface configured to:
transmit the acquired dynamic biometric information to another information processing device; and
perform communication relating to an authentication result based on static biometric information with the another information processing device;
a processor that:
executes an unlock operation to unlock the information processing device in response to the communication relating to the authentication result;
acquires the dynamic biometric information from the dynamic biometric information acquisition sensor after unlocking; and
maintains the unlocked state during a condition that the dynamic biometric information can be acquired,
wherein the wireless communication interface is configured to transmit the dynamic biometric information to the another information processing device via wireless communications such that the dynamic biometric information is used to determine a state of the user and generate information for display on the another information processing device, and
wherein the dynamic biometric information is continuously acquired after the information processing device is unlocked and the wireless communication interface is configured to transmit the dynamic biometric information to the another information processing device continuously or based on starting of an application on the another information processing device.

2. The information processing device according to claim 1,
wherein the wireless communication interface is one of a Bluetooth interface for executing Bluetooth wireless communication or a Wi-Fi interface for executing Wi-Fi wireless communication.

3. The information processing device according to claim 1,
wherein the dynamic biometric information is one of heart rate, pulse, blood pressure, body temperature, amount of sweating, or brain wave and the static biometric information is one of finger print information, facial recognition information, retina information, vein information, or iris information.

4. The information processing device according to claim 1,
wherein the processor is programmed to switch from the unlocked state to locked state when in a condition that the dynamic biometric information cannot be acquired.

5. A method being executed by a first information processing device, comprising:
acquiring, by a dynamic biometric information acquisition sensor, dynamic biometric information from a body of a user;
wirelessly transmitting the acquired dynamic biometric information to a second information processing device;
performing communication relating to an authentication result based on static biometric information with the second information processing device;
executing an unlock operation to unlock the first information processing device in response to the communication relating to the authentication result;
acquiring the dynamic biometric information from the dynamic biometric information acquisition sensor after being in an unlocked state in response to the unlock operation; and
maintaining the unlocked state during a condition that the dynamic biometric information can be acquired,
wherein the dynamic biometric information is transmitted to the second information processing device via wireless communications such that the dynamic biometric information is used to determine a state of the user and generate information for display on the second information processing device, and
wherein the dynamic biometric information is continuously acquired after the first information processing device is unlocked and the dynamic biometric information is transmitted to the second information processing device continuously or based on starting of an application on the second information processing device.

6. The method according to claim 5,
wherein the wireless communication is one of Bluetooth wireless communication or Wi-Fi wireless communication.

7. The method according to claim 5,
wherein the dynamic biometric information is one of heart rate, pulse, blood pressure, body temperature, amount of sweating, or brain wave and the static biometric information is one of finger print information, facial recognition information, retina information, vein information, or iris information.

* * * * *